(12) United States Patent
Kunishige et al.

(10) Patent No.: US 8,648,926 B2
(45) Date of Patent: Feb. 11, 2014

(54) IMAGING DEVICE AND IMAGING DEVICE CONTROL METHOD

(75) Inventors: Keiji Kunishige, Hachioji (JP); Yoshinao Shimada, Hino (JP); Tsutomu Honda, Hachioji (JP)

(73) Assignee: Olympus Imaging Corp., Tokyo (JP)

(*) Notice: Subject to any disclaimer, the term of this patent is extended or adjusted under 35 U.S.C. 154(b) by 388 days.

(21) Appl. No.: 12/949,067

(22) Filed: Nov. 18, 2010

(65) Prior Publication Data

US 2011/0122287 A1 May 26, 2011

(30) Foreign Application Priority Data

Nov. 25, 2009 (JP) ................... 2009-267289

(51) Int. Cl.
*H04N 5/228* (2006.01)
*H04N 5/235* (2006.01)
*H04N 5/262* (2006.01)

(52) U.S. Cl.
USPC .............. 348/222.1; 348/229.1; 348/239

(58) Field of Classification Search
USPC .............. 348/222.1, 239, 345, 346, 347, 348, 348/349, 350, 351, 352, 353, 354, 355, 356, 348/241, 294, 295, 296, 297
See application file for complete search history.

(56) References Cited

U.S. PATENT DOCUMENTS

| | | | | |
|---|---|---|---|---|
| 5,170,202 | A * | 12/1992 | Bell ............... | 396/80 |
| 7,418,150 | B2 | 8/2008 | Myoga et al. | |
| 2001/0019361 | A1* | 9/2001 | Savoye ............ | 348/222 |
| 2006/0187308 | A1* | 8/2006 | Lim et al. ............ | 348/208.4 |
| 2008/0297622 | A1* | 12/2008 | Miyashita ............ | 348/229.1 |
| 2009/0109304 | A1 | 4/2009 | Guan | |
| 2009/0167928 | A1 | 7/2009 | Asukabe | |
| 2010/0194870 | A1* | 8/2010 | Ghita et al. ............ | 348/65 |

FOREIGN PATENT DOCUMENTS

| | | |
|---|---|---|
| CN | 101196670 | 6/2008 |
| JP | 2004-282552 | 10/2004 |
| JP | 2007-300221 | 11/2007 |

(Continued)

OTHER PUBLICATIONS

First Notification of Office Action for Chinese Patent Application No. 201010563092.6, mailed Sep. 29, 2012 (8 pgs.) with translation (13 pgs.).

(Continued)

*Primary Examiner* — Lin Ye
*Assistant Examiner* — Peter Chon
(74) *Attorney, Agent, or Firm* — John C. Pokotylo; Straub & Pokotylo

(57) ABSTRACT

An imaging device of the present invention comprises an imaging section for photoelectrically converting a subject image, and outputting image data, an aperture control section for narrowing subject light flux at a first aperture value and a second aperture value, a shooting control section for, in response to a release instruction, imaging a first image at the first aperture value and, reading out first image data from the imaging section while simultaneously carrying out a stopping down operation to the second aperture value, imaging a second image at the second aperture value and, reading out second image data from the imaging section, and an image processing section for detecting an amount of variation in contrast value for each location in the first image data and the second image data, and carrying out processing to blur at an intensity of blurring according to the amount of variation between each location.

24 Claims, 26 Drawing Sheets

(56) References Cited

FOREIGN PATENT DOCUMENTS

| | | |
|---|---|---|
| JP | 2008-060818 | 3/2008 |
| JP | 2009-017336 | 1/2009 |
| JP | 2009-188650 | 8/2009 |
| JP | 2004-310504 | 11/2009 |

OTHER PUBLICATIONS

Office Action from corresponding Japanese Patent Application No. 2009-267289, mailed Oct. 9, 2013 (3 pgs.)

\* cited by examiner

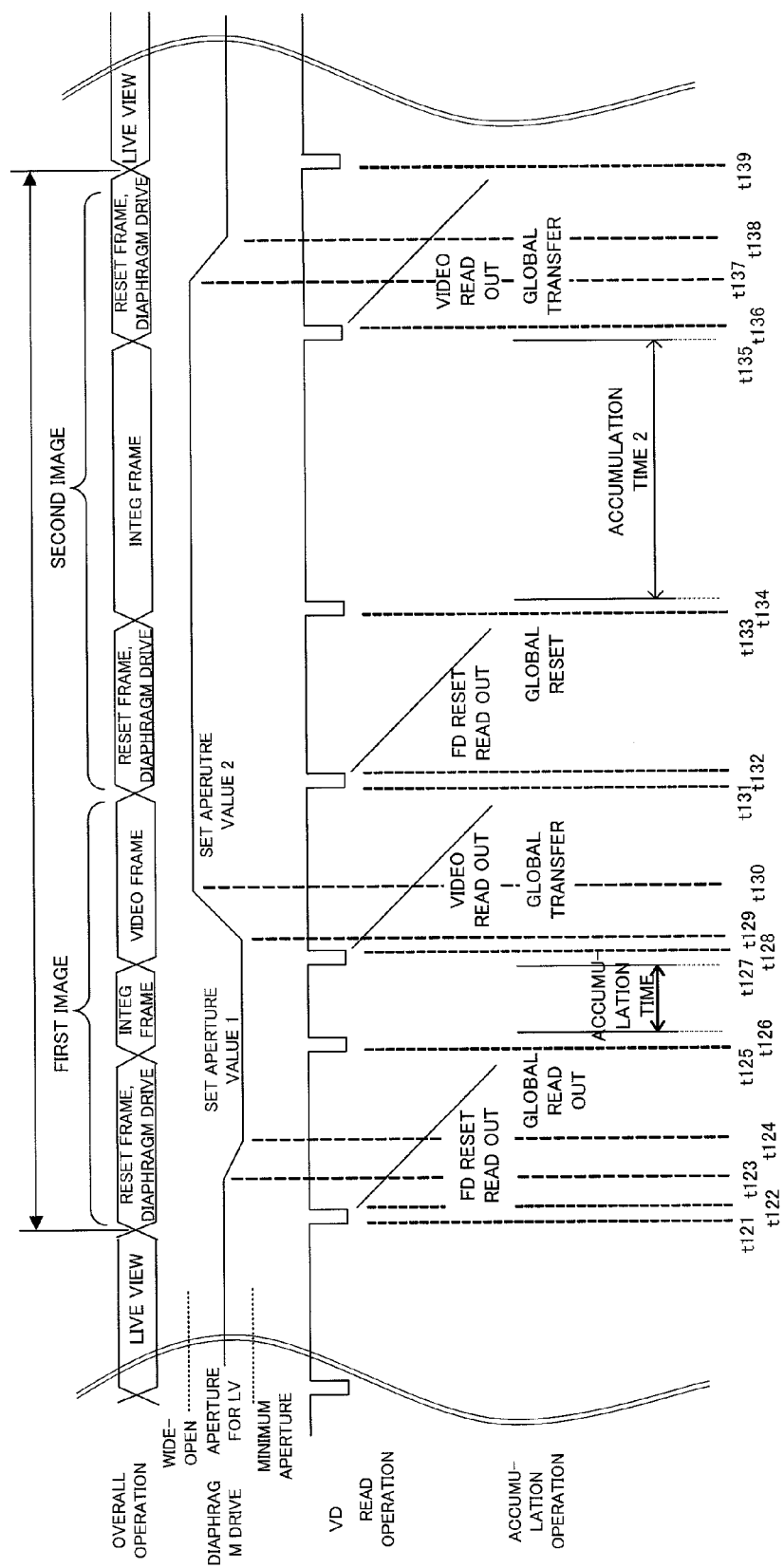

IMAGING DEVICE AND IMAGING DEVICE CONTROL METHOD

Benefit is claimed, under 35 U.S.C. §119, to the filing date of prior Japanese Patent Application No. 2009-267289 filed on Nov. 25, 2009. This application is expressly incorporated herein by reference. The scope of the present invention is not limited to any requirements of the specific embodiments described in the application.

BACKGROUND OF THE INVENTION

1. Field of the Invention

The present invention relates to an imaging device, and to a control method for an imaging device.

2. Description of the Related Art

Depth of field of a taken image varies depending on optical characteristics such as aperture value and focal length. When shooting in sports mode using a telephoto lens, a deep depth of field is preferred. When taking a portrait photograph, however, bokeh, or blurring, is used in a way that is pleasing to the eye. With a 135 film camera (35 mm silver halide film camera), it is possible to sufficiently vary the depth of field by appropriately selecting aperture value and focal length. However, with digital cameras, which have become widespread in recent years, the depth of field becomes deep due to the surface area of the imaging section being small, and even when shooting with the same angle of view as with a film camera prominent background bokeh is not achieved. There have therefore been various proposals for bokeh processing to generate an image that has a shallow depth of field using image processing, to give a taken image that appears as the photographer intended.

For example, Japanese patent laid-open No. 2004-310504 (laid-open Nov. 4, 2004) proposes a method of generating an image having a shallow depth of field from two images taken with different aperture values. Also, Japanese patent laid-open No. 2005-229198 (laid-open Aug. 25, 2005) proposes a bokeh processing method that gives a background of a shallow depth of field by separating image data of a subject region and image data of a background region from a master image, and subjecting the image data of the separated background to bokeh processing, and then combining the background image data after bokeh processing with the master image data. Further, Japanese patent laid-open No. 2009-177782 (laid-open Aug. 6, 2009) proposes bokeh processing for blurring a background by changing an image combining ratio for a master image and a blurred image, based on amount of variation in a high frequency component of two images each having different aperture values.

SUMMARY OF THE INVENTION

The present invention has as its object to provide an imaging device with which it is possible to take pictures with a natural feeling without any sense of unease at the time of shooting, and an imaging device control method.

An imaging device of the present invention comprises an imaging section for photoelectrically converting a subject image formed by a photographing lens, and outputting image data, an aperture control section, arranged on the optical path of the photographing lens, for narrowing subject light flux at a first aperture value and a second aperture value, a shooting control section for, in response to a release instruction, imaging a first image at the first aperture value and, after completion of imaging of the first image, reading out first image data from the imaging section while at the same time carrying out a stopping down operation to the second aperture value using the aperture control section, imaging a second image at the second aperture value and, after completion of imaging of the second image, reading out second image data from the imaging section, and an image processing section for detecting an amount of variation in contrast value for each location in the first image data and the second image data, and carrying out processing to blur at an intensity of blurring according to the amount of variation between each location in the first image data and the second image data.

Also, a control method for an imaging device of the present invention comprises carrying out imaging of a first image at a first aperture value, reading out first image data after imaging of the first image has been completed, while simultaneously carrying out a stopping down operation to drive a diaphragm from the first aperture value to a second aperture value, carrying out imaging of a second image at the second aperture value, reading out second image data after imaging of the second image has been completed, detecting amount of variation in contrast values for each location in the first image data and the second image data, and carrying out image processing to blur at an intensity of blurring according to the amount of variation at each location in the first and second image.

Further, an imaging device of the present invention comprises an imaging section for photoelectrically converting a subject image formed by a photographing lens, and outputting image data, an aperture control section, arranged on the optical path of the photographing lens, for narrowing subject light flux at a first aperture value and a second aperture value, a shooting control section for, in response to a release instruction, imaging a first image at the first aperture value and, after completion of imaging of the first image, reading out first image data from the imaging section while simultaneously carrying out a stopping down operation to the second aperture value using the aperture control section, imaging a second image at the second aperture value and, after completion of imaging of the second image, reading out second image data from the imaging section, and an image processing section for carrying out image processing for the first image data and the second image data that have been read out by the shooting control section.

BRIEF DESCRIPTION OF THE DRAWINGS

FIG. 27 is a timing chart at the time of a shooting operation, in the digital camera of the third embodiment of the present invention.

DETAILED DESCRIPTION OF THE PREFERRED EMBODIMENTS

Preferred embodiments using a camera to which the present invention has been applied will be described in the following in accordance with the drawings. A camera 100 of a first embodiment of the present invention is a digital camera, and to describe it briefly has an imaging section, with a subject image being converted to image data by this imaging section, and the subject image then being subjected to live view display on a display section based on this converted image data. A photographer determines composition and photo opportunity by looking at the live view display at the time of shooting. If a release operation takes place shooting is carried out. At this time, charge accumulation of photoelectric current for pixels of a first frame image with a wide-open aperture value is carried out, the diaphragm is then stopped down once charge accumulation for the first frame is completed, and image data based on charge accumulation of the first frame is read out during this stopping down operation and temporarily stored. Once reading of the image data is complete, charge accumulation of photoelectric current for a second frame image is carried out, and image data based on the charge accumulation is read out after completion of the charge accumulation. Based on the two image data obtained in this single shooting, bokeh processing equivalent to an image of a desired aperture value is carried out, and this processed image data is stored in a storage medium. An already bokeh processed taken image stored in the storage medium can be played back on the display section if playback mode is selected.

Figure 1:
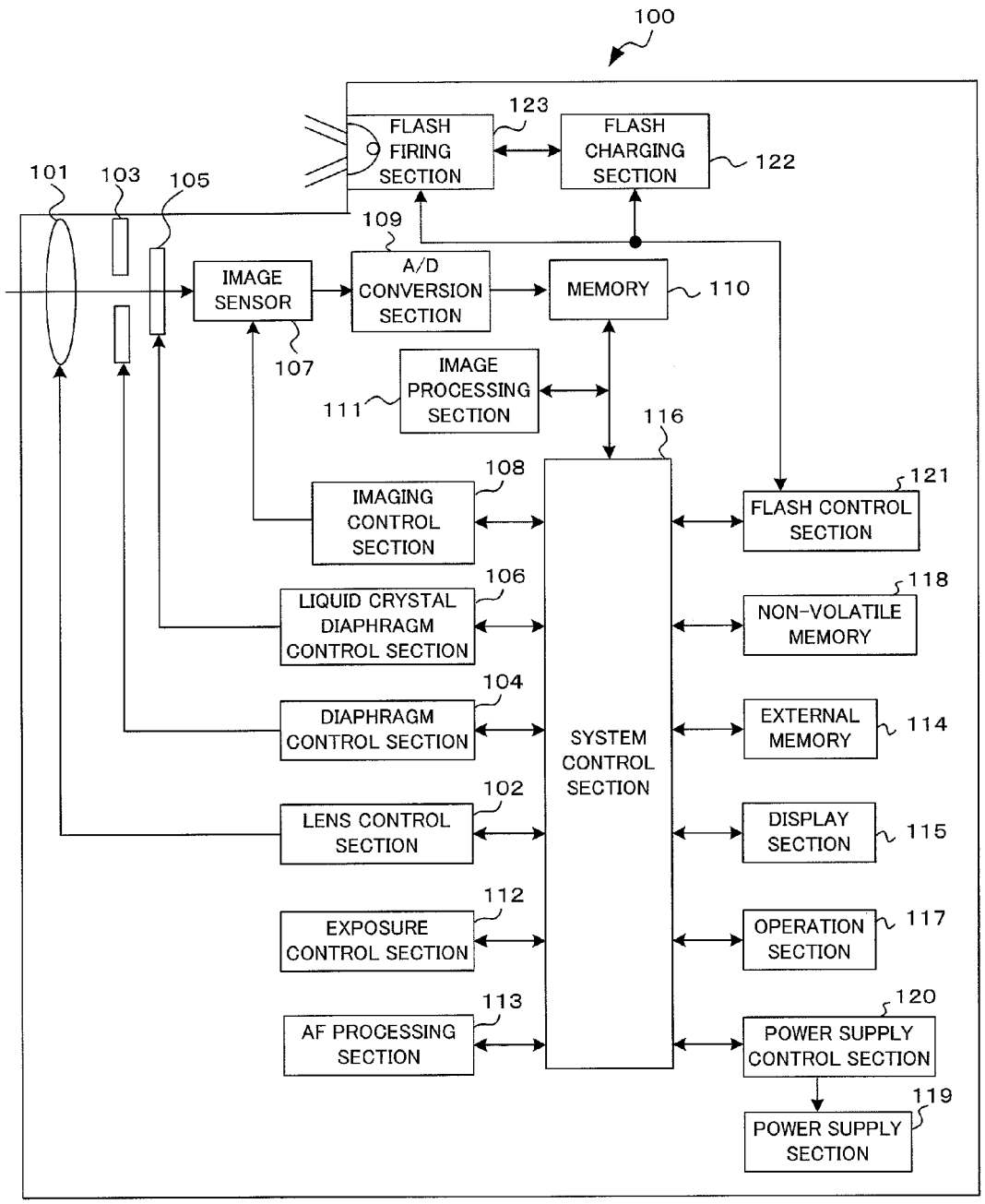
FIG. 1 is a block diagram mainly showing the electrical structure of a digital camera of a first embodiment of the present invention.

FIG. 1 is a block diagram mainly showing the electrical structure of a digital camera 100 of this embodiment. A diaphragm mechanism 103, liquid crystal diaphragm 105 and image sensor 107 are arranged on the optical axis of a photographing lens 101. Output of the image sensor 107 is connected to an A/D converter section 109, and output of the A/D converter section 109 is connected to a memory 110. The memory 110 is connected to an image processing section 111 and a system control section 116. An imaging control section 108, liquid crystal diaphragm control section 106, diaphragm control section 104, lens control section 102, exposure control section 112, AF processing section 113, flash control section 121, non-volatile memory 118, external memory 114, display section 115, operation section 117 and power supply control section 120 are respectively connected to the system control section 116. The above described imaging control section 108 is connected to the image sensor 107, the liquid crystal diaphragm control section 106 is connected to the liquid crystal diaphragm 105, and the lens control section 102 is connected to the photographing lens 101. Also, the power supply control section 120 is connected to a power supply section 119, and the flash control section 121 is respectively connected to a flash charging section 122 and a flash firing section 123.

The photographing lens 101 is an optical system for concentrating subject light flux onto the image sensor 107, to form a subject image. This photographing lens 101 has its focus state varied by being moved in the optical axis direction by the lens control section 102 that operates in response to commands from the system control section 116. The diaphragm mechanism 103 adjusts an amount of incident light of the subject light flux that is to be incident on the image sensor 107 through the photographing lens 101. The diaphragm mechanism 103 has its opening amount controlled by the diaphragm control section 104 that operates in response to instructions from the system control section 116. The diaphragm mechanism 103, diaphragm control section 104 and system control section 116 together function as a diagram control section.

The liquid crystal diaphragm 105 is constituted by liquid crystal capable of switching between a transparent state and an opaque state, and is capable of switching between two states of a wide-open value and an F8 state. The liquid crystal diaphragm 105 is connected to the liquid crystal diaphragm control section 106 that operates in response to commands from the system control section 116, and is controlled to either the wide-open state or the F8 state. This liquid crystal diaphragm 105 is used in order to carry out bokeh enhancement processing at the time of live view display I which will be described later using FIG. 12. In the case where bokeh enhancement processing at the time of live view display is omitted, the liquid crystal diaphragm 105 and the liquid crystal diaphragm control section 106 can also be omitted. In this embodiment the liquid crystal diaphragm 105 is capable of switching between wide-open and F8, but these aperture values are not limiting and it is also possible to have other aperture values.

The image sensor 107 having a function as an imaging section comprises Bayer array color filters arranged on a front surface, and photoelectric conversion elements such as photodiodes arranged in correspondence with the color filters. Each pixel is made up of each color filter and its corresponding photoelectric conversion element, and an imaging region is made up of a pixel group. The image sensor 107 receives light that has been focused by the photographing lens 101 at each pixel and converts to photoelectric current, this photoelectric current is stored in a capacitor (hereafter referred to as a floating diffusion), and output to the A/D converter section 109 as an analog voltage signals (image signal). The imaging control section 108 carries out operational control of the image sensor 107 in response to instructions from the system control section 116.

Here, the image sensor 107 of this embodiment is a CMOS image sensor, and has a global shutter function. A global shutter carries out shutter operation to start charge accumulation at the same time for all pixels, and finish charge accumulation for all pixels at the same time. The structure of each pixel of the image sensor 107 will be described later using FIG. 19. A rolling shutter, in contrast to a global shutter, has one to a number of lines made into a block, and within a block charge accumulation is started and ended at the same time, but between blocks there is a time difference for read out and a shutter operation is carried out to cause a charge accumulation operation sequentially for every block.

The A/D converter section 109 converts an analog voltage signal (image signal) output from the image sensor 107 into a digital image signal (image data). The memory 110 is a storage section for temporarily storing various data, such as image data acquired in the A/D converter section 109 and image data that has been subjected to processing by the image processing section 111. In this specification, as long as a signal is based on an image signal output from the image sensor 107 it will be referred to as image data, and this includes image processed signals, not only a signal that has been subjected to A/D conversion by the A/D converter section 109.

The image processing section 111 that functions as an image processing section reads out image data that has been temporarily stored in the memory 110, and carries out image processing such as white balance correction, demosaicing processing and color conversion processing on this image data. The image processing section 111 also carries out image compression at the time of storage in the external memory 114, which will be described later, and expansion of compressed image data that has been read out from the external memory 114. Further, the image processing section 111 processes image data for two images taken with different aperture values, to carry out image processing to enhance bokeh.

The exposure control section 112 calculates subject brightness (brightness of a scene containing the subject) using image data temporarily stored in the memory 110. There is obviously no problem in calculating subject brightness using a dedicated photosensor.

The AF (autofocus) processing section 113 extracts signals for high frequency components from image data temporarily stored in the memory 110, and acquires a focus evaluation value using AF integration processing. The system control section 116 carries out drive control so as to bring the photographing lens 101 to its focused position, by means of the lens control section 102, based on the focus evaluation value. The AF processing section 113 can also be provided with a dedicated sensor, such as a TTL phase difference AF sensor, to obtain an out-of-focus amount of the photographing lens 101 based on output of this dedicated sensor.

The external memory 114 is, for example, a storage medium that is inserted into and taken out of the camera body, and stores image data that has been compressed in the image processing section 111, and its associated data. A storage medium for storing image data etc. is not limited to one that is inserted into or removed from the camera body, and can be a storage medium such as a hard disk built in to the camera body.

The display section 115 has a display such as a liquid crystal monitor or organic EL arranged on a rear surface of the body or the like, and live view display is carried out based on image data. The display section 115 also carries out playback display of taken images that have been stored in the external memory 114, and carries out display of menu screens for setting such as exposure control values or display and shooting modes etc.

The system control section 116 functioning as a shooting control section is constituted by an ASIC including a CPU etc., and performs unified control of various sequences of the camera 100, such as the imaging control section 108 and the flash control section 121. The operation section 117 has various operation members such as a power supply button, release button and various input keys. If a user operates any of the operations members of the operation section 117, the system control section 116 executes various sequences according to the user operation.

The power supply button within the operation section 117 is an operation member for instructing to turn a power supply of the camera 100 on or off, and if the power supply button is pressed the power supply of the system control section 116 is turned on, while if it is pressed again the power supply is turned off. A release button has a two-stage switch with a first release switch and a second release switch. If the release button is pressed down halfway, the first release switch is turned on, and if the release button is pressed down further from the halfway point to a fully pressed state the second release switch is turned on. If the first release switch is turned on, the system control section 116 executes shooting preparation sequences such as AE processing and AF processing. If the second release switch is turned on, the system control section 116 executes a shooting sequence and takes a picture. Using the menu screens displayed on the display section 115, the user can perform setting of shooting conditions at the time of shooting by operating input keys of the operation section 117.

The non-volatile memory 118 is an electrically rewritable non-volatile memory, and stores various parameters that are required for operation of the camera 100. The non-volatile memory 118 also stores programs executed by the system control section 116. The system control section 116 executes various sequences in accordance with programs stored in the non-volatile memory 118 and the reading out of parameters stored in the non-volatile memory 118.

The power supply section 119 supplies power necessary for operation of each section of the camera 100, and is constituted by, for example, a power supply battery such as a secondary cell. The power supply control section 120 performs control of the power supply section 119, such as detecting power supply voltage and remaining capacity of the battery constituting the power supply section 119.

The flash control section 121 controls a charging operation of the flash charging section 122, and a firing operation of the flash firing section 123, in accordance with instructions from the system control section 116. The flash charging section 122 comprises a boost circuit for boosting the power supply voltage of the power supply section 119, and a capacitor for holding energy at the voltage boosted by the boost circuit, and holds the energy required to fire the flash firing section 123.

The flash firing section 123 is provided with an arc tube such as a xenon (Xe) tube for example, and a reflecting hood, and fires using the energy held in the capacitor of the flash charging section 122 when a firing instructing is received from the flash control section 121.

Next, the outline structure of the pixels of the image sensor 107 will be described using FIG. 19. A circuit for a single pixel of the image sensor 107 is made up of a photodiode PD constituting a single pixel, a floating diffusion MEM that is a storage section for photoelectric conversion current, and 5 transistors Tr1-Tr5. φRM represents a reset pulse, φTR represents a transfer pulse, φRPD represents a photodiode reset pulse, and φSE represents a line select pulse. The structure and operation of a pixel of this image sensor 107 is disclosed in paragraphs [0052] to [0057] and [0079] to [0083] of Japanese patent laid-open No. 2009-188650, and so these disclosures are incorporated here and detailed description will be omitted.

Figure 2:
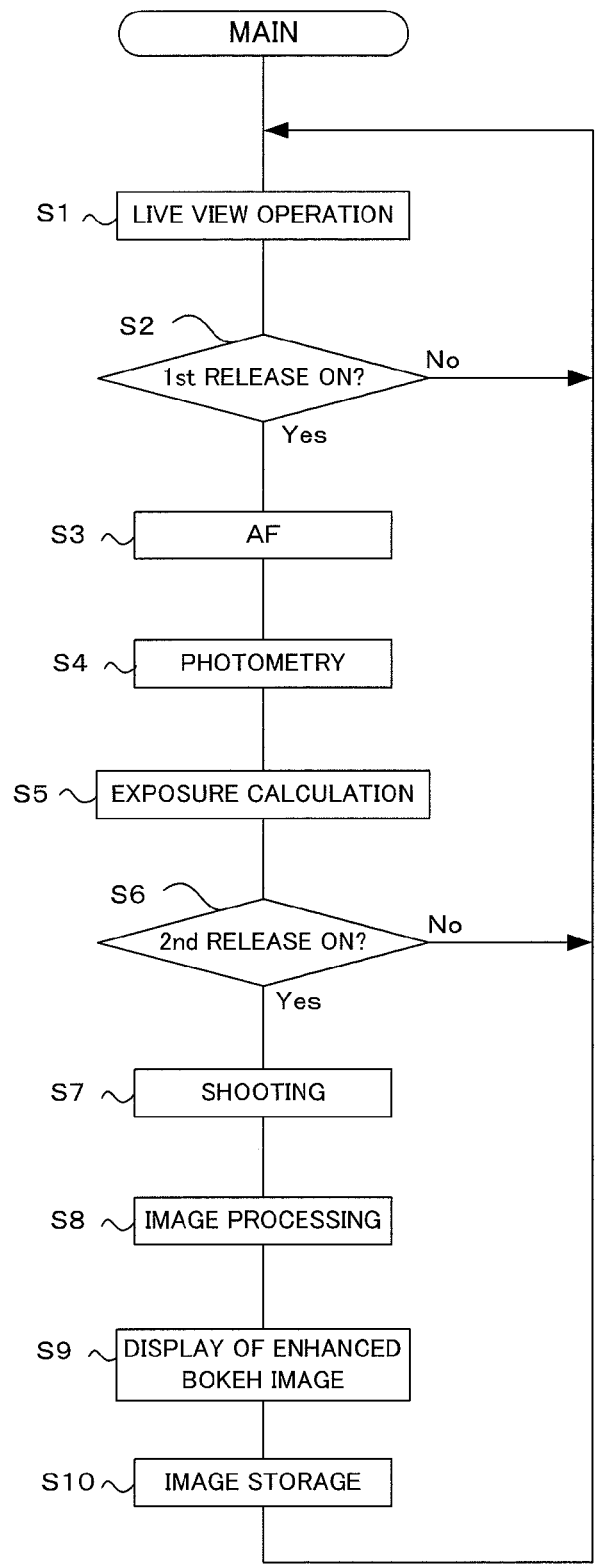
FIG. 2 is a flowchart showing a main operation of the digital camera of the first embodiment of the present invention.
Figure 3:
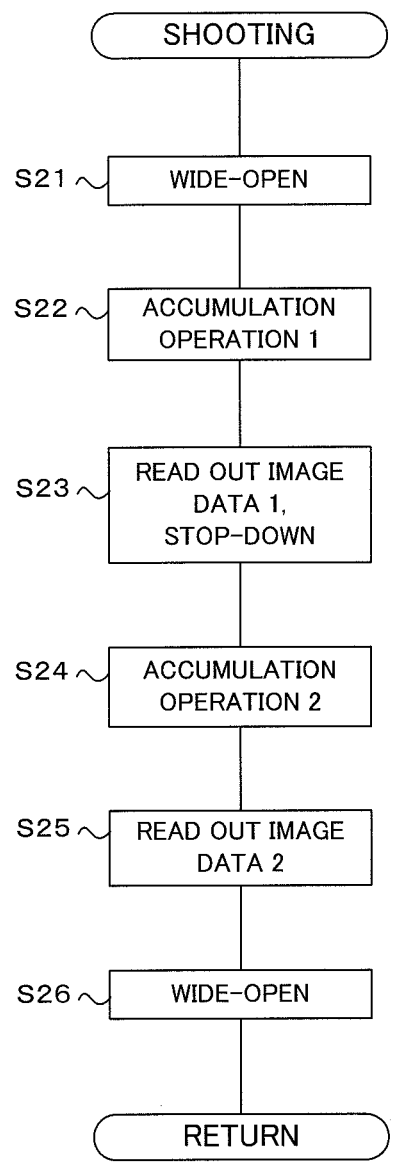
FIG. 3 is a flowchart showing a shooting operation of the digital camera of the first embodiment of the present invention.

Next, operation of the camera 100 of this embodiment will be described using the flowchart shown in FIG. 2 to FIG. 4. This processing flow is executed by the system control section 116 in accordance with programs stored in the non-volatile memory 118. The processing flow shown in FIG. 2 is the main routine. Execution of this main routine commences once the power supply button of the operation section 117 is turned on.

If operation of the main routine commences, a live view operation is first carried out (S1). With the live view operation, image data that has been subjected to image processing for live view display by the image processing section 111, based on image signals output from the image sensor 107, is displayed on the display section 115. The photographer determines composition by looking at this live view display, and determines when to press the release button.

If live view operation is carried out, it is next determined whether or not the release button of the operation section 117 has been pressed down halfway, that is, whether or not the first release switch is on (S2). If the result of this determination is that the first release switch is not on, step S1 is returned to and the live view operation is repeatedly carried out.

If the result of determination in step S2 is that the first release is on, namely that the release button has been pressed down halfway, AF processing is next carried out (S3). In this step, the system control section 116 controls the focus state of the photographing lens 101 via the lens control section 102, based on a focus evaluation value obtained by the AF processing section 113, so that the subject image formed on the image sensor 107 becomes sharpest, in other words, so that a focused state is achieved.

Once AF processing has been carried out, photometry is then performed (S4) and exposure is calculated (S5). In these steps the system control section 116 causes execution of calculation of subject brightness in the exposure control section 112, and obtains exposure control values such as aperture value and shutter speed (accumulation time) using the calculated subject brightness. In calculating aperture value and shutter speed it is possible to use APEX computation, but in this embodiment a table of aperture values and shutter speeds corresponding to subject brightness is stored in the non-volatile memory 118, and aperture value and shutter speed are determined by referencing this table. Also, in this calculation shutter speeds giving the optimum exposure for two aperture values, namely a wide-open aperture value of the diaphragm mechanism 103 and a specified aperture value determined by subject brightness, is obtained.

Once exposure calculation has been carried out, it is next determined whether or not the release button of the operation section 117 has been pressed down fully, that is, whether or not the second release is on (S6). If the result of this determination is that the second release is not on, processing returns to step S1. Until the second release becomes on, the system control section 116 repeatedly executes from step S1 to step S5, and follows AF (automatic focus adjustment) and AE (automatic exposure control) for changes in the subject each time the first release is on.

On the other hand, if the result of the determination in step S6 is that the second release is on, shooting is carried out (S7). In this step, image data for the subject image at the wide-open aperture value is acquired, followed by the acquisition of image data for the subject image at an aperture value that is different from the wide-open aperture value. Details of the processing flow for this shooting will be described later using FIG. 3.

Once shooting has been carried out, image processing for the image data acquired in step S7 is carried out (S8). In this image processing, general image processing such as white balance correction is carried out in the image processing section 111, as well as bokeh processing to generate an image with enhanced bokeh using the two sets of image data acquired for different aperture values. Details of this image processing with enhanced bokeh will be described later using the processing flow for bokeh simulation shown in FIG. 4.

Once image processing has been carried out, the image having enhanced bokeh that was generated in step S8 is displayed on the display section 115 for only a specified time (S9). Once display of the enhanced bokeh image has been carried out, the system control section 116 carries out image compression of image data with enhanced bokeh that was obtained in the image processing section 111, and stores this image data in the external memory 114 (S10). Once the image storage has been carried out, processing returns to step S1. If the power supply button of the operation section 117 is operated again, the processing of the main routine is terminated.

Next, details of the shooting subroutine of step S7 will be described using the flowchart shown in FIG. 3. This subroutine is also executed by the system control section 116 in accordance with programs stored in the non-volatile memory 118. During this shooting operation, the liquid crystal diaphragm 105 is in a transparent state, and is not involved in exposure control in any way. If the shooting subroutine is entered, first of all the diaphragm is set to wide-open. (S21). Here, the system control section 116 puts the diaphragm mechanism 103 in the wide-open state using the diaphragm control section 104.

Next, an accumulation operation 1 of the image sensor 107 is carried out by the imaging control section 108 in the wide-open state (S22). In this accumulation operation 1, photoelectric current for each pixel of the image sensor 107 is subjected to charge accumulation in the accumulation section (floating diffusion MEM). For this accumulation time, an accumulation time (shutter speed) calculated so as to give optimum exposure at the wide-open aperture condition in the exposure calculation in step S5 is adopted. This embodiment is not provided with a mechanical shutter, and control of exposure time that is normally fulfilled by a mechanical shutter is achieved by time control of the accumulation operation of the image sensor 107.

Once the accumulation operation is completed, image data 1 is read out, and the diaphragm is stopped down (S23). In this step an image signal accumulated in the image sensor 107 during the accumulation operation 1 is read out, subjected to A/D conversion by the A/D converter section 109, and this image data (image data 1) is temporarily stored in the memory 110. Also, in parallel with this read-out operation, the diaphragm control section 104 performs stopping down of the diaphragm mechanism 103 so that it becomes the specified aperture value calculated in step S5.

Once image data 1 read-out and stopping down of the diaphragm mechanism 103 have been carried out, an accumulation operation 2 is carried out by the imaging control section 108 (S24). For the accumulation time for this accumulation operation 2, an accumulation time (shutter speed) calculated so as to give optimum exposure at the specified aperture value of the exposure calculation in step S5 is adopted.

Once the accumulation operation 2 has been completed, this image data 2 is next read out (S25). In this step an image signal accumulated in the image sensor 107 during the accumulation operation 2 is read out, subjected to A/D conversion by the A/D converter section 109, and this image data (image data 2) is temporarily stored in the memory 110.

Once the read out of image data 2 has commenced, the diaphragm is returned to the wide-open state (S26). In this step, the system control section 116 returns the diaphragm mechanism 103 to the wide-open state using the diaphragm control section 104. Once the diaphragm has been put in the wide-open state, the originating processing flow is returned to. By executing the above described steps, shooting operations to acquire image data of two images at different apertures is completed, Next, operation in the shooting subroutine shown in FIG. 3 will be described in detail using the timing chart shown in FIG. 13. If the shooting operation is entered, then before setting the diaphragm to wide open a vertical synchronization signal (hereafter referred to as VD) is set to L level (time t01). If VD is set to L level, reset level read-out of the floating diffusion (hereafter called FD) is commenced (time t02). This FD corresponds to the floating diffusion MEM in FIG. 19. During this FD reset level read-out the diaphragm mechanism 103 is driven to the wide-open state (time t03-t04).

Once a specified time, for example 50 ms (hereafter "50 ms" will be used as an example time), has elapsed from setting VD to L level, VD is set to L level again (time t05). If the L level of VF is released after that, charge accumulation of photoelectric current generated by the photodiodes of the image sensor 107 is started (time t06). This accumulation time is a time to achieve appropriate exposure with the wide-open aperture, as described in step S22.

Once the accumulation time has elapsed (time t07), VD becomes L level and the charge accumulation of photoelectric current is completed. As mentioned previously, the shutter for the image sensor 107 of this embodiment is a global shutter, where charge accumulation of photoelectric currents starts at the same time for each pixel (time t06), and once a time corresponding to the shutter speed has elapsed charge accumulation is completed at the same time for each pixel (time t07).

Once the L level of VD has been removed (time t08), read-out of image data 1 described for step S23 is commenced. By subtracting the FD reset signal that was read out during time t02-t05 from this read-out image data 1 it is possible to obtain image data with the wide open aperture. The stopping down that was described in step S23 is also carried out (time t09-t10). With the example shown in FIG. 13, the diaphragm is stopped down to F8.

Once 50 ms has elapsed from setting VD to L level (time t07), VD is set to L level again (time t11), and from the time the L level is removed (time t12) read-out of the FD reset signal is commenced again.

Once 50 ms has elapsed from setting VD to L level (time t09), VD is set to L level again (time t13), and from the time the L level is removed (time t14) charge accumulation of the photoelectric current generated by the photodiodes of the image sensor 107 in the stopped down state is commenced. This accumulation time is a time for achieving appropriate exposure in the stopped down state (F8 in the example of FIG. 13), as was described in step S24.

Once the accumulation time has elapsed (time t15), VD is set to L level and the charge accumulation of photoelectric current is completed. As mentioned previously, the shutter for the image sensor 107 of this embodiment is a global shutter, and so accumulation of photoelectric currents starts at the same time for each pixel, and ends at the same time for each pixel.

Once the L level for VD is removed (time t16), read-out of image data 2 that was described in step S25 is commenced. By subtracting the FD reset signal that was read out during time t11-t13 from the read-out image data 2 it is possible to obtain image data in the stopped down state. The diaphragm is also returned from the stopped down state to the aperture value before shooting (time t17-t18) Once 50 ms has elapsed from the time L level of VD (time t19), VD is set to L level again, and the live view display state is returned to.

Figure 13:
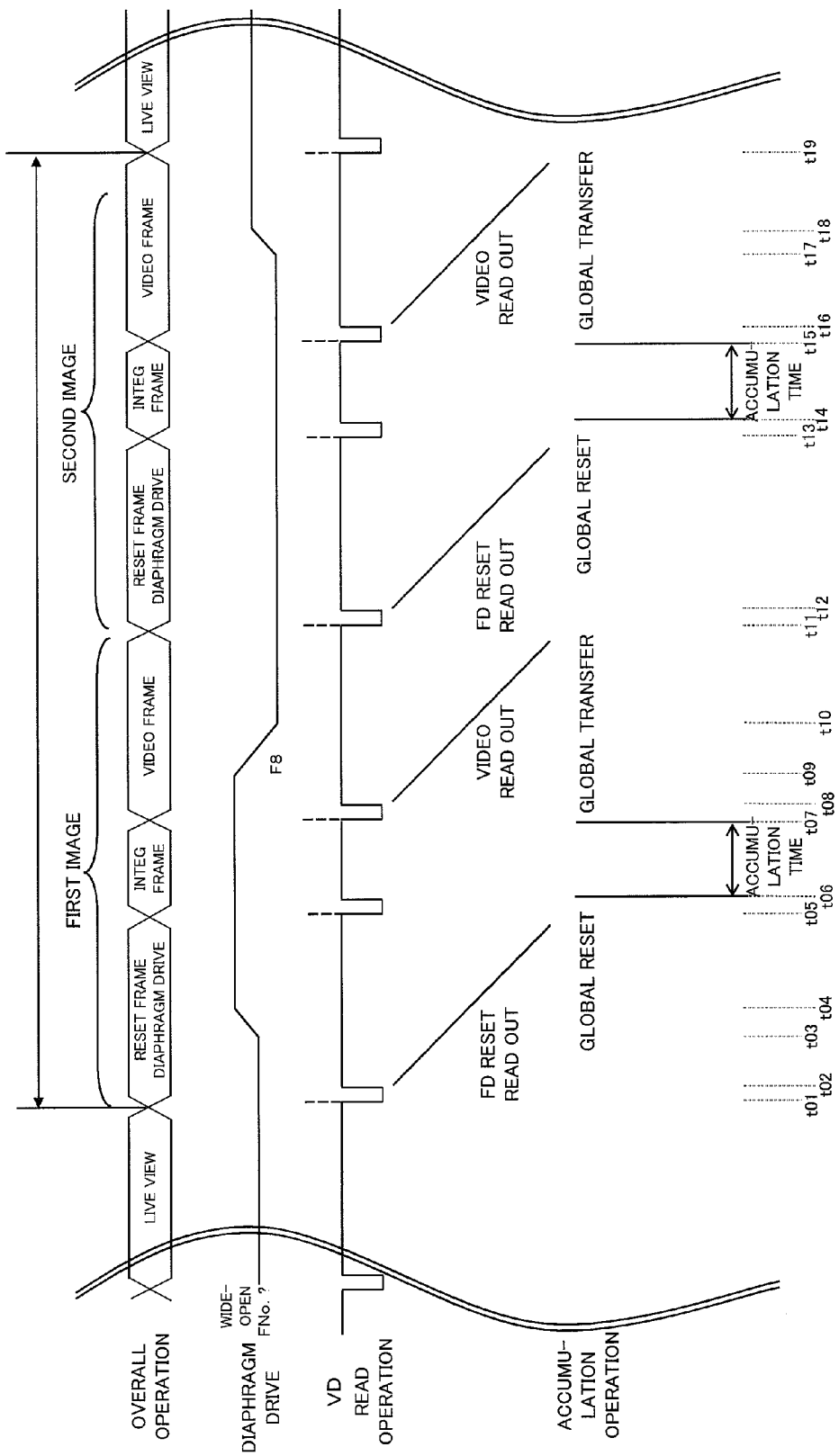
FIG. 13 is a timing chart at the time of a shooting operation, in the digital camera of the first embodiment of the present invention.

In this manner, in this embodiment, the diaphragm is set to wide open during time t03 to t04, and image data with a wide-open aperture is obtained during time t06-t07. Also, stopping down to a specified aperture value is carried out during time t11-t12, and image data at the specified aperture is obtained during time t14-t15. In FIG. 13, a state stopped down from wide-open is assumed at the time of live view display, but in the case of maintaining the wide-open state at the time of live view display it is possible to omit the drive to the wide-open state during time t03-t04.

Next, detailed operation of the bokeh simulation which is handled during the image processing of step 8 will be described using the flowchart shown in FIG. 4. The two image data acquired in the shooting subroutine of step S7 are for different aperture values at the time of image acquisition, and have different image brightness, and so brightness correction processing is carried out in steps S31 to S34 so that brightness becomes substantially the same in the two images.

In the brightness correction processing, calculation of average brightness Kopen for the wide-open image is first carried out (S31). Here, average brightness is calculated by summing image data based on an image signal for each pixel for the wide-open state acquired by subtracting the reset signal, read out in step S23.

Once Kopen has been calculated average brightness KF8 of the image in the stopped down state (F8) is calculated (S32). Here, average brightness is calculated by summing image data based on an image signal for each pixel for the specified aperture (F8 in the illustrated example) acquired by subtracting the reset signal, read out in step S25.

Once KF8 has been calculated, a brightness correction coefficient H is calculated by computation of KF8/Kopen (S33). Here the brightness correction coefficient H is calculated by dividing KF8, that was calculated in step S32, by Kopen that was calculated in step S31. Once the brightness correction coefficient H has been calculated, brightness correction for the wide-open image is carried out with the brightness correction coefficient H (S34). Here brightness is corrected by multiplying the image data for each pixel acquired in the wide-open state by the brightness correction coefficient H.

If brightness correction for image data acquired in the wide-open state has been carried out, then a bokeh amount bx for a virtual aperture value (desired aperture value Fno. x) is obtained in steps S35 to S44, and a bokeh image is generated using this bokeh amount bx.

Figure 5A:
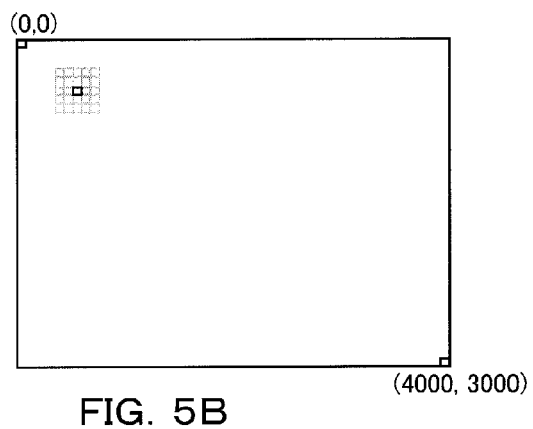
FIG. 5A-FIG. 5D are drawings for describing bokeh processing in the digital camera of the first embodiment of the present invention.

First an evaluation pixel (X, Y) is determined (S35). Coordinates of each pixel of the image sensor 107 range from (0,0) to (4000, 3000) in this embodiment, and as shown in FIG. 5A (0,0) corresponds to an upper left corner of the image region while (4000, 3000) corresponds to a lower right corner of the image region. In this step S35 processing is started from (0,0) which is the origin of the image region as an initial value for the evaluation pixel.

Evaluation pixel evaluation area determination is then carried out (S36). An evaluation pixel evaluation area is a plurality of pixels around the evaluation pixel, and this area is made the bokeh amount calculation region. This evaluation area is made a size appropriate to the bokeh amount calculation. If the evaluation area is too large, the grasp of localized bokeh effect on the screen becomes too vague, and demarcation near the boundary between the background and the subject becomes vague. Conversely if the area is too small precision of bokeh amount calculation is inadequate, or there may be a problem with processing time. Taking these facts into consideration, with this embodiment a total of nine pixels are made into an evaluation area, made up of a three by three pixel matrix, as shown in FIG. 5A-FIG. 5D, but can be made an appropriate value depending on the situation.

Once the evaluation pixel evaluation area has been determined, calculation of bokeh amount bopen for the evaluation area of the wide open Fopen image is carried out (S37). In this step, contrast within the evaluation area determined in step S36 is obtained using image data in the wide-open state, and this contrast is made the bokeh amount bopen of the evaluation area. There are various methods for obtaining contrast, but it is possible, for example, to sum differences between adjacent pixels within the evaluation area.

Once the bokeh amount bopen has been calculated, calculation of bokeh amount b8 for the evaluation area of the F8 image is carried out (S38). In this step, contrast within the evaluation area determined in step S36 is obtained by the same method as in step S37 using the image data for aperture F8 (FIG. 5B), and this is made the bokeh amount b8 of the evaluation area.

Once calculation of the bokeh amount b8 has been carried out, a difference amount Δb between bokeh amounts for the wide-open and F8 images is calculated (S39). Here Δb=(b8−bopen), that is, a difference amount Δb is obtained by subtracting bokeh amount bopen calculated in step S37 from the bokeh amount b8 calculated in step S38.

Figure 6:
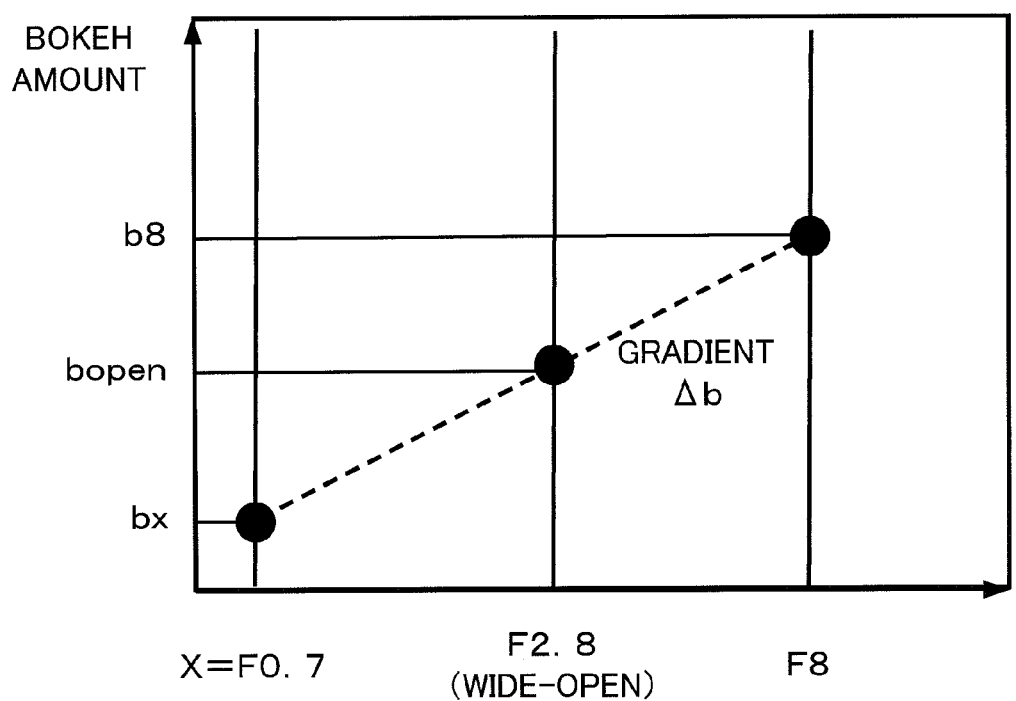
FIG. 6 is a graph for describing the estimation of bokeh amount at a specified aperture value from two images, in the digital camera of the first embodiment of the present invention.

Once the difference amount b for Bokeh amount has been calculated, a Bokeh amount bx for a virtual aperture value (specified F no. x) is estimated (S40). As shown in FIG. 6, if bokeh amounts for wide-open (F2.8) in the illustrated example) and a virtual aperture value (F8 in the illustrated example) are known, then using a gradient Δb of bokeh amount it is possible to estimate bokeh amount bx for a virtual aperture value (specified Fno. x (F0.7 in the example of FIG. 6)) with a straight-line approximation. In this embodiment, this estimated bokeh amount be is obtained using the arithmetic expression $$bx = bopen + \{\Delta b(Fx - Fopen)\}/(F8 - Fopen).$$

The system control section 116 also acts as a virtual aperture value setting section for setting the virtual aperture value.

Figure 5C:
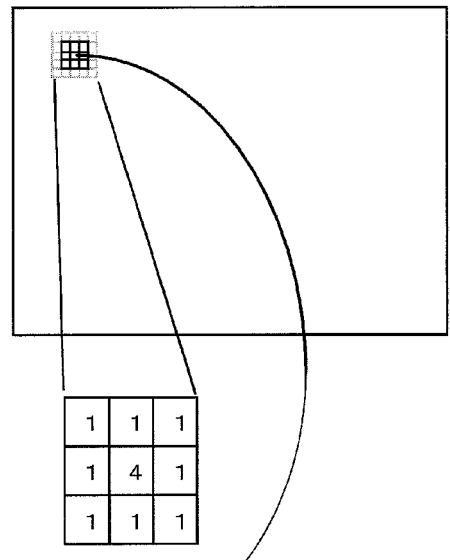
Figure 5B:
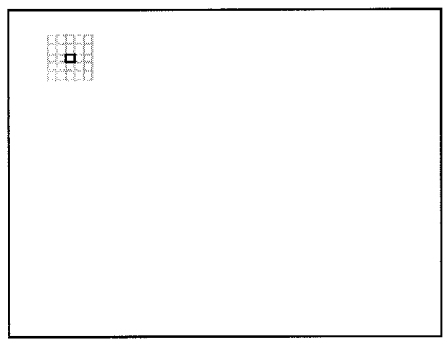

Once the estimated bokeh amount bx has been estimated, a bokeh function for approximating to the estimated bokeh amount bx for a virtual aperture value (specified F no. x) is created (S41). As the bokeh function, a smoothing filter such as is shown in FIG. 5C is used, but this is not limiting and it is possible to have any function that can convert to estimated bokeh amount bx.

Figure 5D:
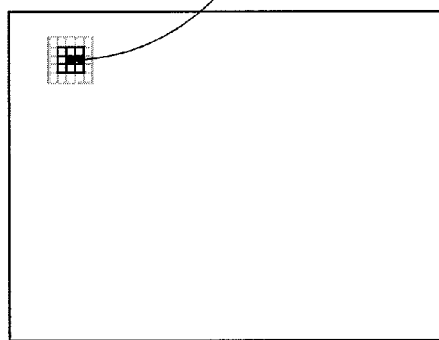

Once the bokeh function has been created, the bokeh function is applied to a pixel of an applied image (X,Y) (S42). With the smoothing filter shown in FIG. 5C, the evaluation pixel (X,Y) is multiplied by a coefficient 4, the pixels surrounding the evaluation pixel are multiplied by 1, and they are all summed. Then, a computation to divide by the sum total is carried out (with the example of the smoothing filter shown in FIG. 5C, it is divided by 12 (4+1×8)), and the value of the evaluation pixel (X,Y) is converted to the calculation result, as shown in FIG. 5D.

Once the bokeh function has been applied, transfer of the evaluation pixel (X,Y) is carried out (S43). The initial value for the evaluation pixel was set to (0,0) in step S35, and starting from this position (0,0) the evaluation pixel is initially advance to the right in the same line, and when the right end of that line is reached moved one line down. Specifically, in this embodiment the evaluation pixel is moved in the order (0,1), (0,2), (0,3), . . . , (0,2999), (0,3000), (1,1), (1,2), . . . , (3999, 3000), (4000, 1), . . . , (4000, 3000).

Once movement of the evaluation pixel has been carried out, it is determined whether or not processing has been carried out for all pixels (S44). In this embodiment, it is determined that processing has been completed with (4000, 3000) as the evaluation pixel. If the result of this determination is that all pixels have not been processed, step S36 is returned to and processing is repeated. On the other hand, if the result of determination is that processing has been completed for all pixels, the originating processing flow is returned to and other image processing is carried out.

Figure 7:
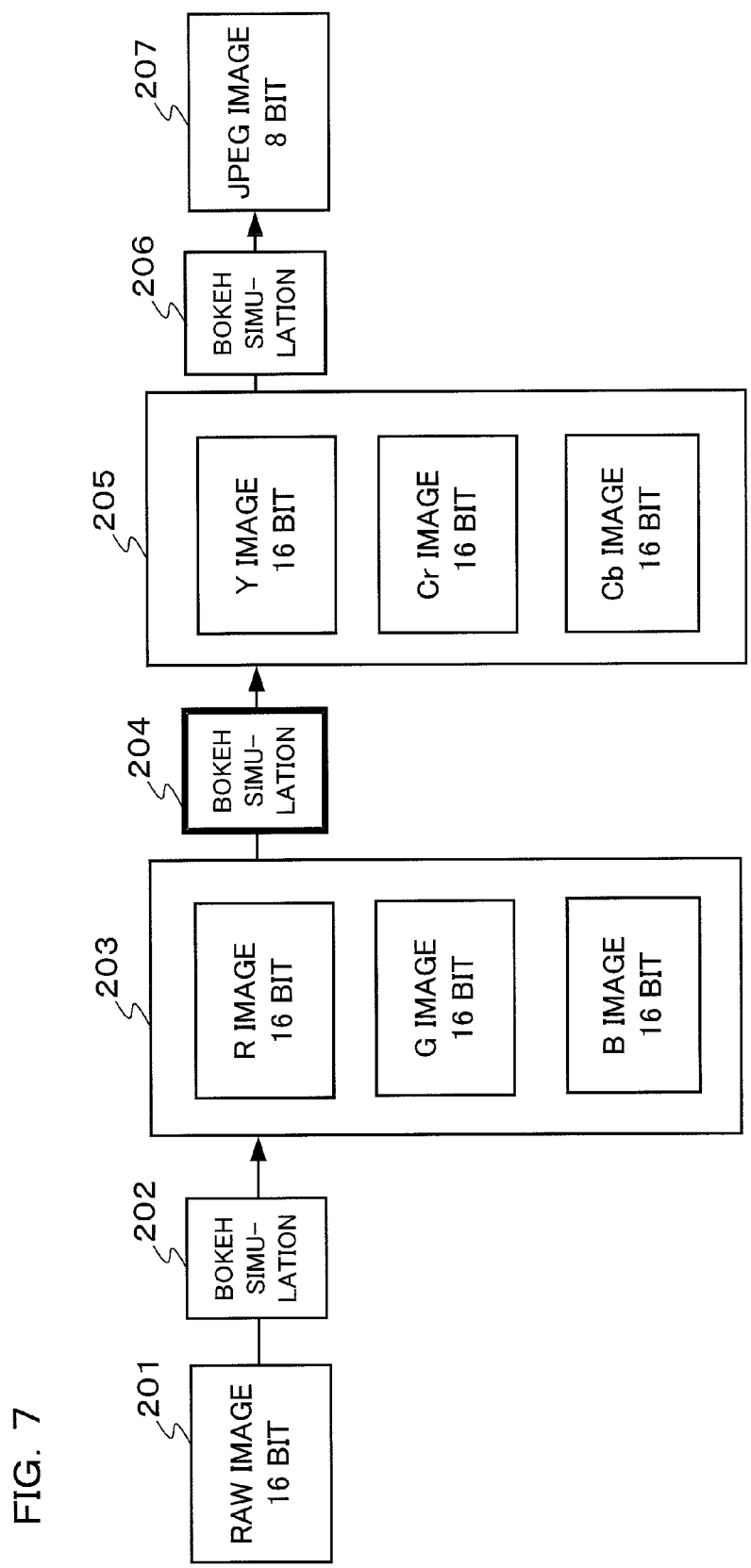
FIG. 7 is a drawing for describing a position where bokeh processing is carried out, in the digital camera of the first embodiment of the present invention.

Next image data for carrying out the bokeh simulation shown in FIG. 4 will be described using FIG. 7. FIG. 7 shows the flow of processing of image data. 16 bit RAW image data 201 output from the image sensor 107 and processed by the image processing section 111 is further processed by the image processing section 111 into 16 bit RGB image data 203. This RGB image data 203 is processed into 16 bit YCC image data 205 that is made up of brightness and color signals, and this 16 bit YCC image data 205 is further subjected to image compression to, give 8 bit JPEG image data 207.

There are three passes for bokeh simulation, either carrying out bokeh simulation 202 between the RAW image data 201 and the RGB image data 203, carrying out bokeh simulation 204 between the RGB image data 203 and the YCC image data 205, or carrying out bokeh simulation 206 between the YCC image data 205 and the JPEG image data 207.

In the case of carrying out bokeh simulation for the JPEG image data 207, with 8 bits there is a small information amount, and in particular γ correction is carried out in high brightness regions, and data is course and in some places missing, which means it is not suitable for subjecting to bokeh simulation. On the other hand, for the RAW image data 201, RGB image data 203 and the YCC image data 205, with 16 bits there is a large amount of information, and there is linearity with respect to brightness, and therefore it is possible to carry out bokeh simulation for any of these image data.

Figure 8:
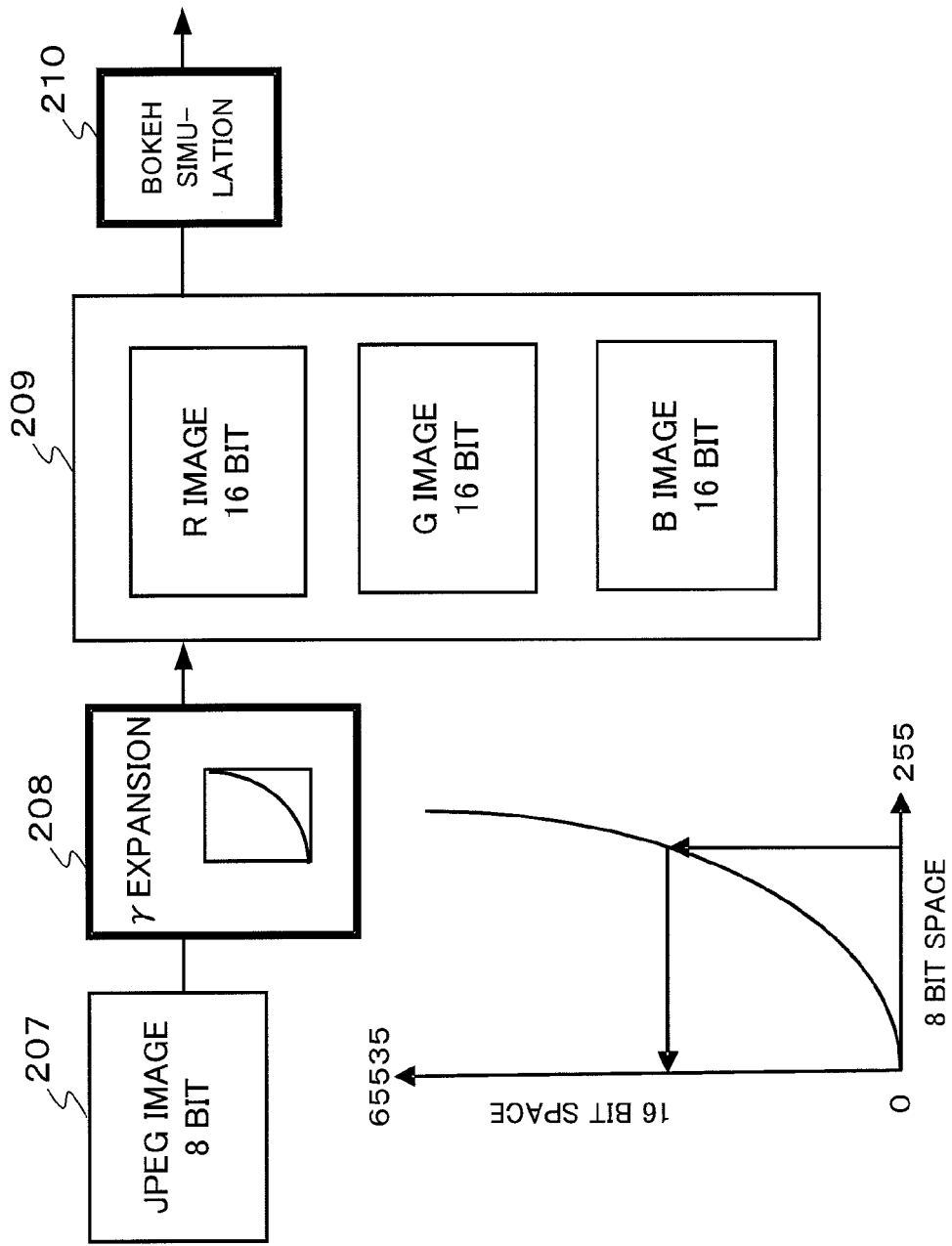
FIG. 8 is a drawing for describing modified example 1 of a position where bokeh processing is carried out, in the digital camera of the first embodiment of the present invention.

When bokeh simulation is carried out for JPEG data that has been JPEG compressed, as shown in FIG. 8, γ expansion is carried out on the JPEG image data 207, image data 208 that has been subjected to this γ expansion is again returned to RGB image data 209, and Bokeh simulation 210 is carried out. Carrying out γ expansion once in this way is in order to linearly expand the high brightness side, as in the graph shown in FIG. 8, and as a result it is possible to skillfully reproduce a bokeh effect for a light source when there is a bright light source.

Figure 9:
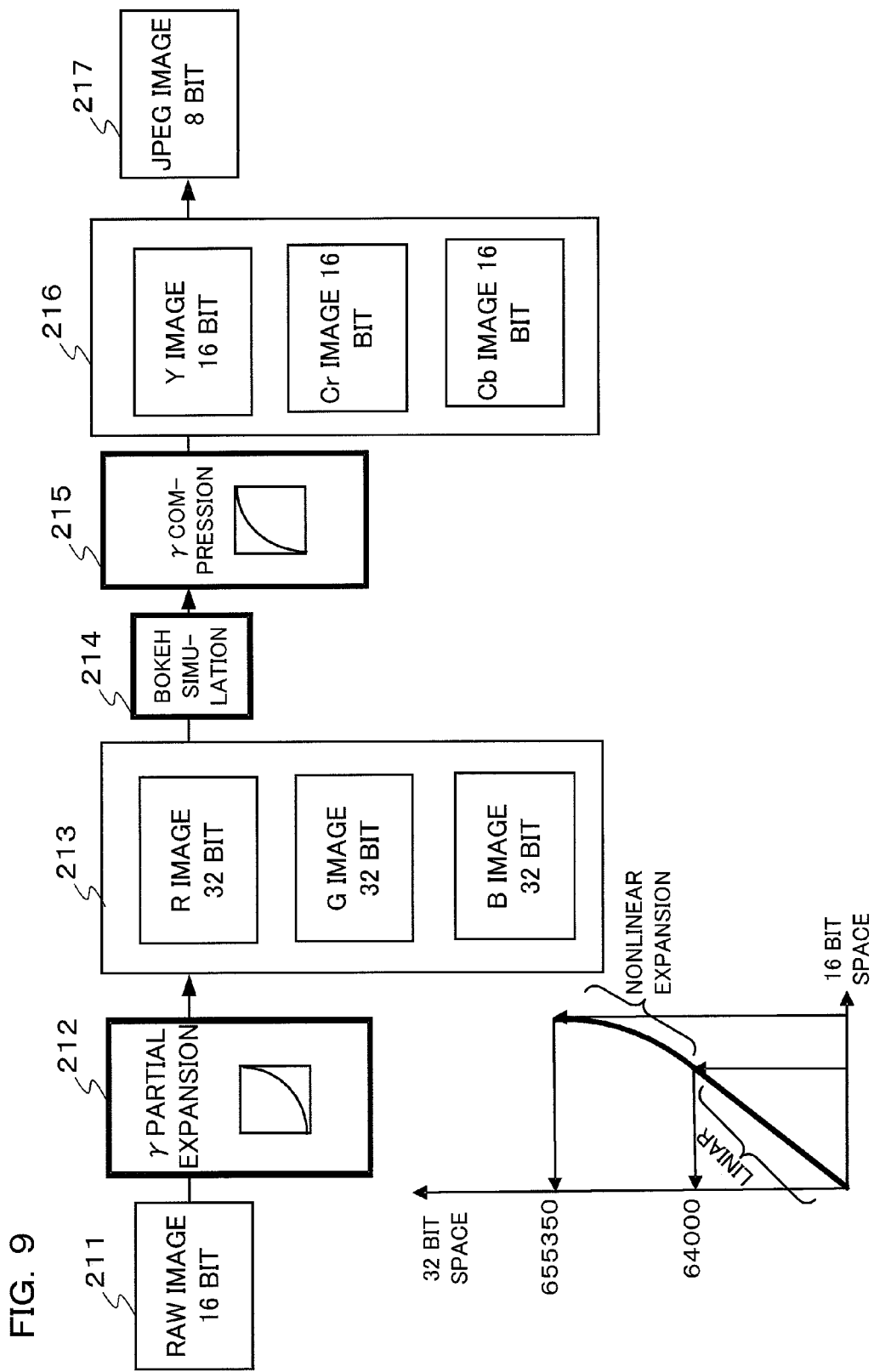
FIG. 9 is a drawing for describing modified example 2 of a position where bokeh processing is carried out, in the digital camera of the first embodiment of the present invention.

With the example shown in FIG. 8, non-linear JPEG image data is simply returned to linear RGB image data, and a normal point light source will sometimes be saturated even with RAW image data. In order to solve this problem therefore, as shown in FIG. 9, it is possible to carry out γ partial expansion 212 on the RAW image data 211. With γ partial expansion 212, as shown by the graph in FIG. 9, non-linear expansion is carried out on the high brightness side data of the RAW image data 211 (in the drawing, 64000 and above), while data at a lower brightness side than that is kept linear.

Image data that has been subjected to γ partial expansion 212 is processed into 32 bit RGB image data 213, and it is possible to carry out bokeh simulation 214 on this RGB image data 213. By carrying out γ compression 215 on the image data that has been subjected to the bokeh simulation 214, expansion due to γ partial expansion 212 is returned to normal. There is also conversion to 16 bit YCC image data 216, followed by conversion of the YCC image data 216 to 8 bit JPEG image data 217. With the example shown in FIG. 9, as described previously, even if there is an image that is saturated, such as a point light source, it is possible to obtains a bokeh image equivalent to the bokeh state at a specified aperture.

Next, storage of bokeh image data at the time of the image storage carried out in step S10 will be described using FIG. 10A to FIG. 12. Generally, in a digital camera one or both of RAW image data and JPEG image data are stored at the time of shooting, in a format designated in advance by the user. When the stored image data is JPEG image data, it is only necessary to store JPEG image data that has been subjected to bokeh simulation as was described in FIG. 7 to FIG. 9.

However, RAW image data is, by its very nature, data that has not been subjected to any processing, so for RAW image data, applying bokeh processing means this cannot be stored. Generally RAW data has been developed on a personal computer (hereafter called a PC), and so at this time it is preferable to perform bokeh simulation on a PC. For JPEG image data also, it is possible that there are cases where post processing such as increasing bokeh amount is carried out on a PC.

With this embodiment therefore, at the time of image data storage, information to enable bokeh simulation on a PC is stored. Specifically, in a stored image, a bokeh amount variation Δb associated with each pixel across the entire image, and aperture values of the image for which the bokeh amount variation was calculated, are attached to image data and stored.

Figure 10A:
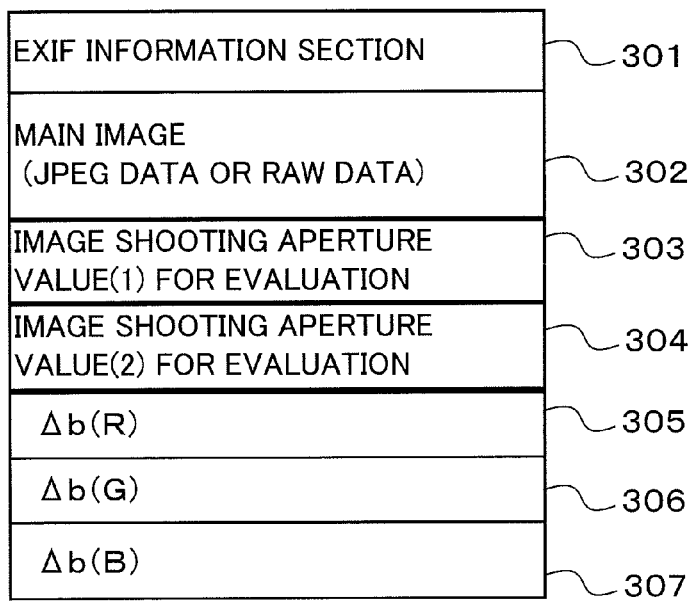
FIG. 10A and FIG. 10B are drawings showing the data structure of an image file, in the digital camera of the first embodiment of the present invention.

FIG. 10A shows image data stored in an EXIF format stored in the external memory 114. First, image data of a main image is stored in a region 302, and the image data format here is JPEG data or RAW image data. Aperture values of images taken at different aperture values are respectively stored in regions 303 and 304. A bokeh amount variation Δb is stored in regions 305-307 for each of R, G, B.

Instead of information on the aperture values of images for which bokeh amount variation Δb was calculated, a value of the bokeh amount variation Δb divided by a difference in aperture values, namely $$\Delta b/(F8-F\text{open})$$

can be stored. Here, F8 is the aperture value when bokeh amount variation Δb was calculated, and the aperture value at the time of shooting is used.

Figure 10B:
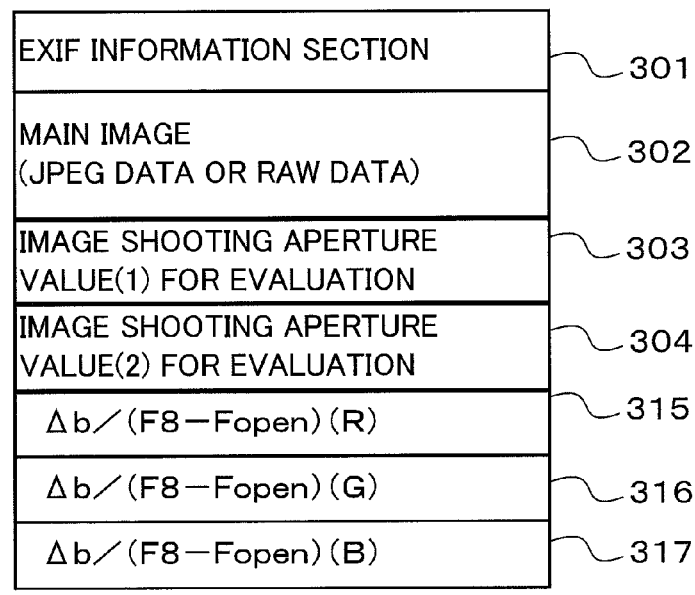

As shown in FIG. 10B, storage information at this time is the same as FIG. 10A for regions 301 to 304. However, instead of the storage for region 305 to region 307, a value that is bokeh amount variation Δb divided by aperture value for each of RGB is stored from region 315 to region 317.

Data of Δb (R), Δb (G) and Δb (G) stored in region 305 to region 307, and Δb/(F8−Fopen)(R), Δb/(F8−Fopen)(G) and Δb/(F8−Fopen) (B) stored in region 315 to 317 have only a normal low frequency component, and it is possible to subject these data to JPEG compression so that data amount is made small.

In this manner, with this embodiment as a main image only a single image data, respective aperture values for two different images, and a bokeh amount variation Δb are stored, and so it is possible to reduce data amount significantly compared to that when respectively storing image data for two different images. Also, in the case of developing RAW image data or in the case of subjecting JPEG image data to further bokeh processing, using the stored image data on a PC, it is possible to carry out bokeh processing using the stored aperture value information and bokeh variation amount etc. As bokeh processing it is possible for a PC to execute the bokeh simulation shown in FIG. 4.

Also, with respect to image data of the main image stored in region 302, in the case of JPEG format it is image data that has been subjected to bokeh processing, and in the case of RAW format, RAW image data for the wide-open side that is closer to the final image is stored. However, since there are cases where a deep focus image is initially desired, in a case where a selection section for selecting whether or not bokeh simulation is to be carried out is provided, and the bokeh simulation has been selected, it is possible to automatically carry out additional shooting at the wide-open aperture and at a specified aperture (for example, F8), and store the additionally shot images in addition to the shot image. In this case the additionally shot image data at the wide-open aperture value and the specified aperture value can be either RAW format or JPEG format.

As a result, three image files are possible, namely an image file for the main image, an image file at the wide-open aperture value, and an image file at the specified aperture value. Here, in order to simplify associating the three image files, in this embodiment the file names are made the same, and an extension name is made different.

Figure 11:
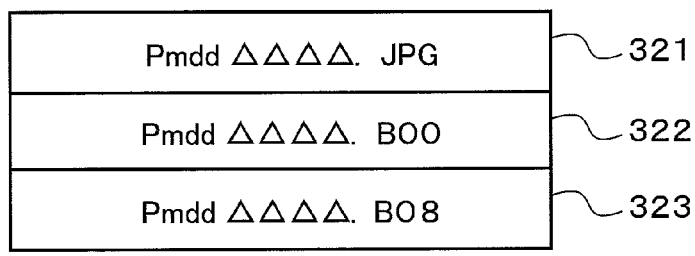
FIG. 11 is a drawing for describing file naming in the digital camera of the first embodiment of the present invention.

For example, as shown in FIG. 11, for the main image file 321 the extension name is made JPG if it is JPEG format image data and RAW if it is RAW format image data, and this extension is assigned to the image file name (with the example of FIG. 11, Pmdd ΔΔΔΔ). For the evaluation image files for bokeh evaluation 322 and 323, extension names are made something other than JPG or RAW (B00 and B08 in the example of FIG. 11), and the files are stored as identical objects having the same file name as the main image file (Pmdd ΔΔΔΔ with the example of FIG. 11). The evaluation image file 322 is an image for a wide-open aperture value, and the evaluation image file 323 is an image at aperture F8.

Next the live view display of step S1 will be described using FIG. 12. Live view display is generally display using image data in the wide-open state. However, with that approach it is not possible to observe an image that has been subjected to bokeh processing beforehand. With this embodiment therefore, in addition to the image in the wide-open state, it is made possible to also display an image that has been subjected to bokeh enhancement processing even when performing live view display.

Figure 12:
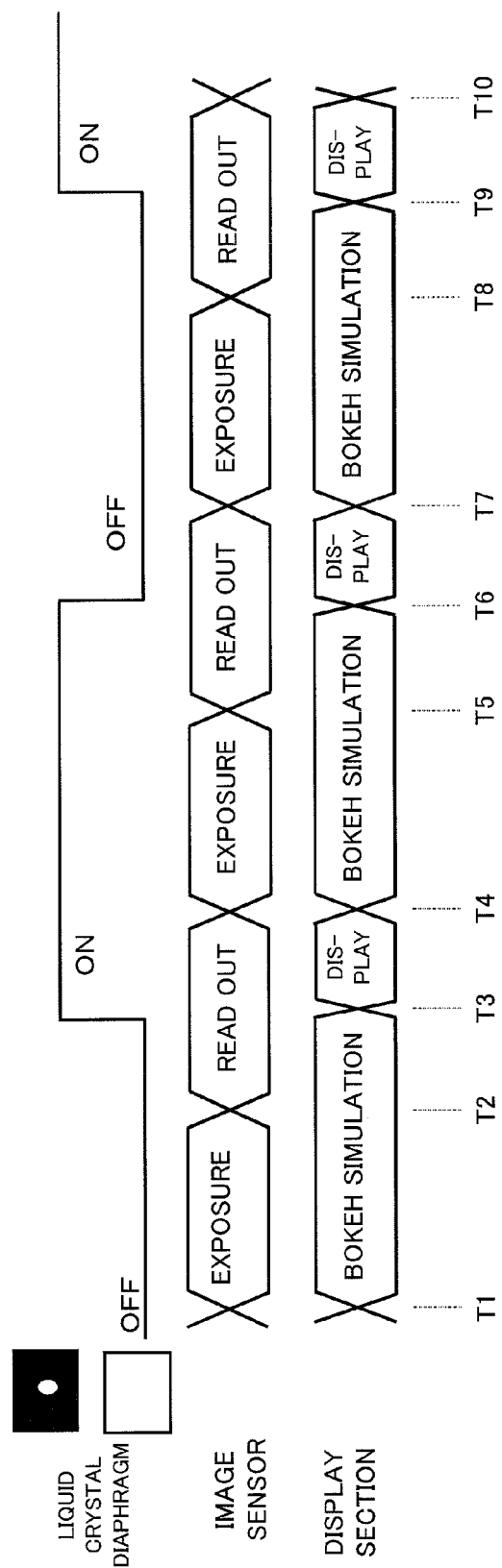
FIG. 12 is a drawing showing operating states of a liquid crystal diaphragm, an image sensor and a display section, in order to display an image that has been subjected to bokeh enhancement processing at the time of live view display, in the digital camera of the first embodiment of the present invention.

In FIG. 12, at times T3, T6 and T9 the liquid crystal diaphragm 105 switches between a transparent state (equivalent to wide-open) and a stopped down state (equivalent to F8), under the control of the liquid crystal diaphragm control section 106. During time T1-T2 when the liquid crystal diaphragm 105 is in a transparent state, the image sensor 107 carries out exposure, and image data based on photoelectric current stored at this time is read out at time T2-T4. Next, from time T4-T5 the image sensor 107 carries out exposure with the liquid crystal diaphragm 105 stopped down to F8, and image data at this time is read out from T5-T7.

Figure 4:
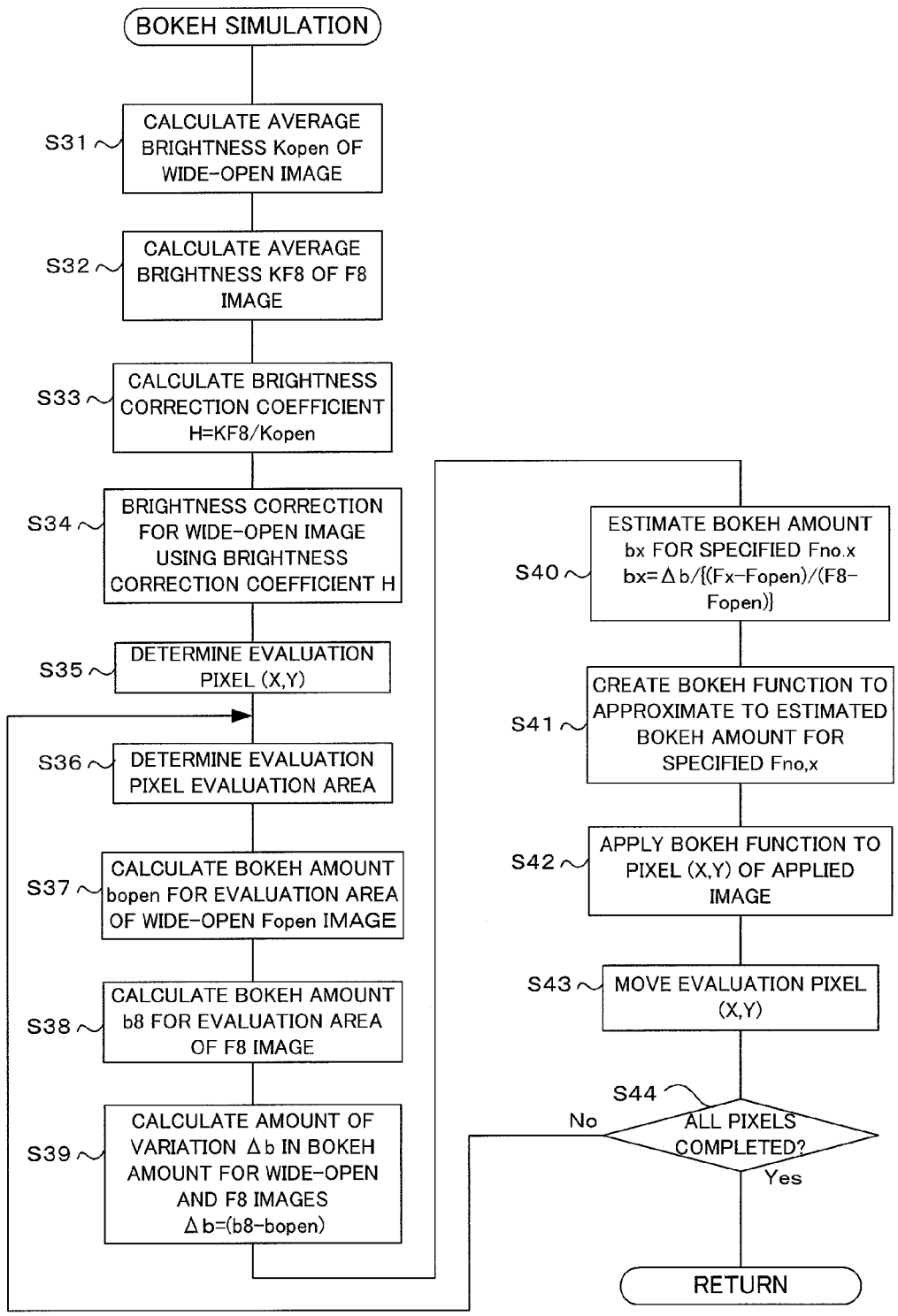
FIG. 4 is a flowchart showing a bokeh simulation operation of the digital camera of the first embodiment of the present invention.

Since two images are obtained, one with the liquid crystal diaphragm 105 in the transparent state (equivalent to a wide-open aperture value) and one with the liquid crystal diaphragm 105 in the stopped down state (equivalent to F8), in the period T7-T9 bokeh enhancement processing is carried out by executing the bokeh simulation shown in FIG. 4. An image based on image data that has undergone this bokeh enhancement processing is displayed from time T9 to T10.

In this way images are obtained in two aperture states by changing over the transparent state of the liquid crystal diaphragm 105, bokeh simulation is applied to these two images and an image that has been subjected to bokeh enhancement processing is displayed. It is therefore possible to see bokeh when bokeh enhancement processing has been carried out, before a release operation.

As has been described above, with the first embodiment of the present invention image data is acquired in a wide-open state, next image data is acquired in a state that is stopped down from the wide-open state, and bokeh enhancement processing is carried out based on the two image data. It is therefore possible to carry out bokeh processing with a natural feeling and without a feeling of incongruity at the time of shooting. In particular, with this embodiment a so-called mechanical shutter is not provided, and two image data are acquired by controlling charge accumulation time for photoelectric current in an image sensor. There are therefore not two shutter sounds when shooting once, and the photographer is not made to feel uneasy.

Next, a modified example 1 of the image sensor 107 of the first embodiment of the present invention that uses a rolling shutter will be described. The outline structure of a pixel of the image sensor 107 of modified example 1 will be described using FIG. 20. A circuit for a single pixel of the image sensor 107 is made up of a photodiode PD constituting a single pixel, a floating diffusion MEM that is a storage section for photoelectric conversion current, and 4 transistors Tr11-Tr14.

Figure 19:
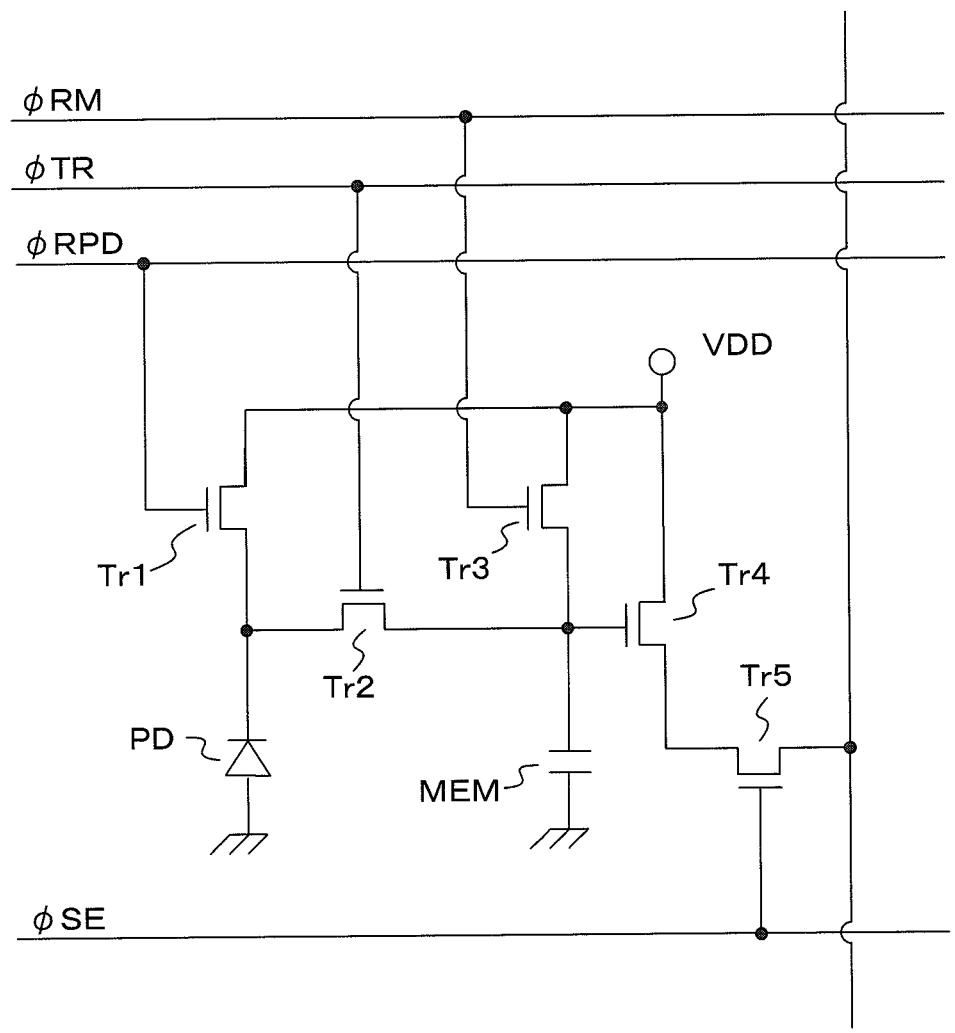
FIG. 19 is a drawing showing the circuit structure for a single pixel of an image sensor of the digital camera of the first embodiment of the present invention.
Figure 20:
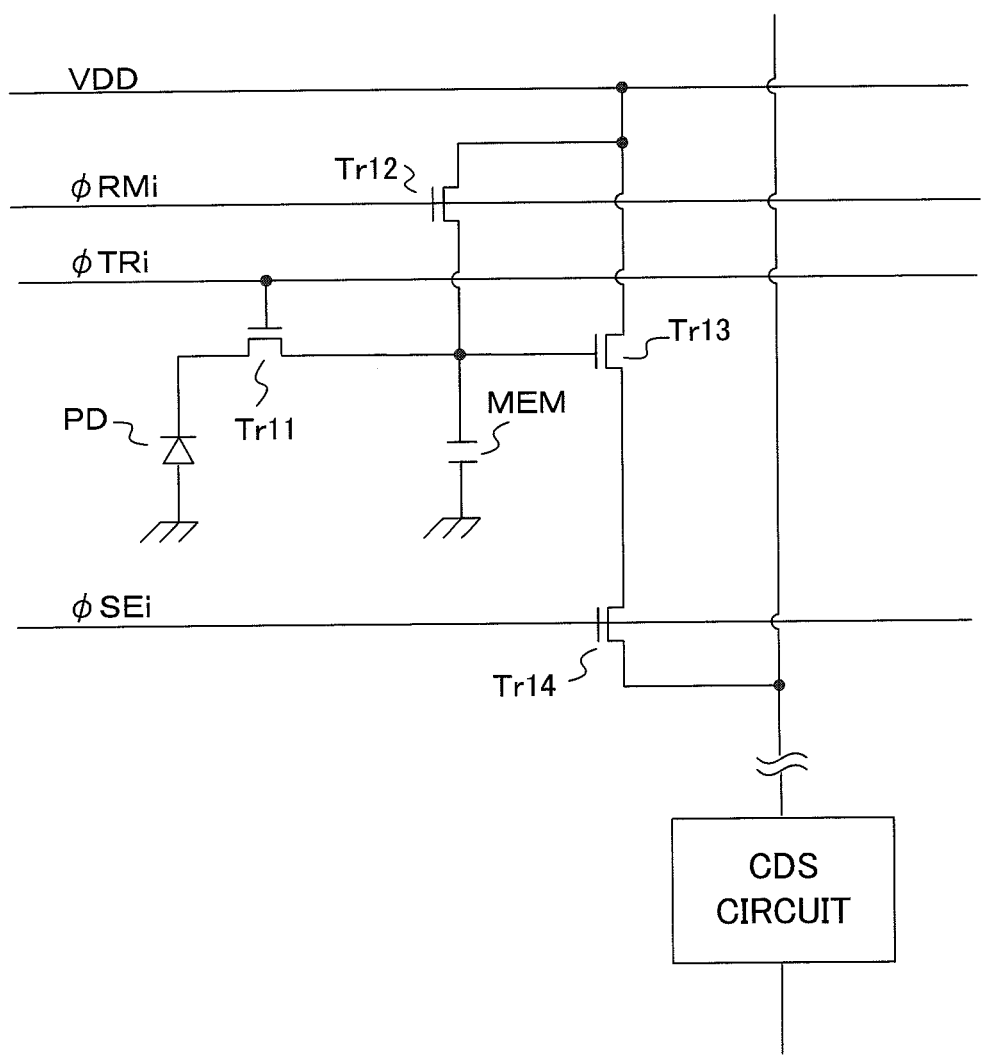
FIG. 20 is a drawing showing the circuit structure for a single pixel of an image sensor of modified example 1 in the digital camera of the first embodiment of the present invention.

Compared to the case of the image sensor 107 having a global shutter shown in FIG. 19 described previously, the transistor Tr2 of FIG. 19 is roughly equivalent to Tr11 in FIG. 20, transistor Tr3 is equivalent to transistor Tr12, transistor Tr4 is equivalent to transistor Tr13, and transistor Tr5 is equivalent to transistor Tr14. In the circuit of FIG. 20 there is no transistor equivalent to transistor Tr1 in FIG. 19.

Also, in FIG. 20, φRMi represents a reset pulse, φTRi represents a transfer pulse, and φSEi represents a line select pulse. The structure and operation of a pixel of the image sensor 107 of modified example 1 is disclosed in paragraphs [0002] to [0016] of Japanese patent laid-open No. 2009-188650, and so these disclosures are incorporated here and detailed description will be omitted.

Figure 14:
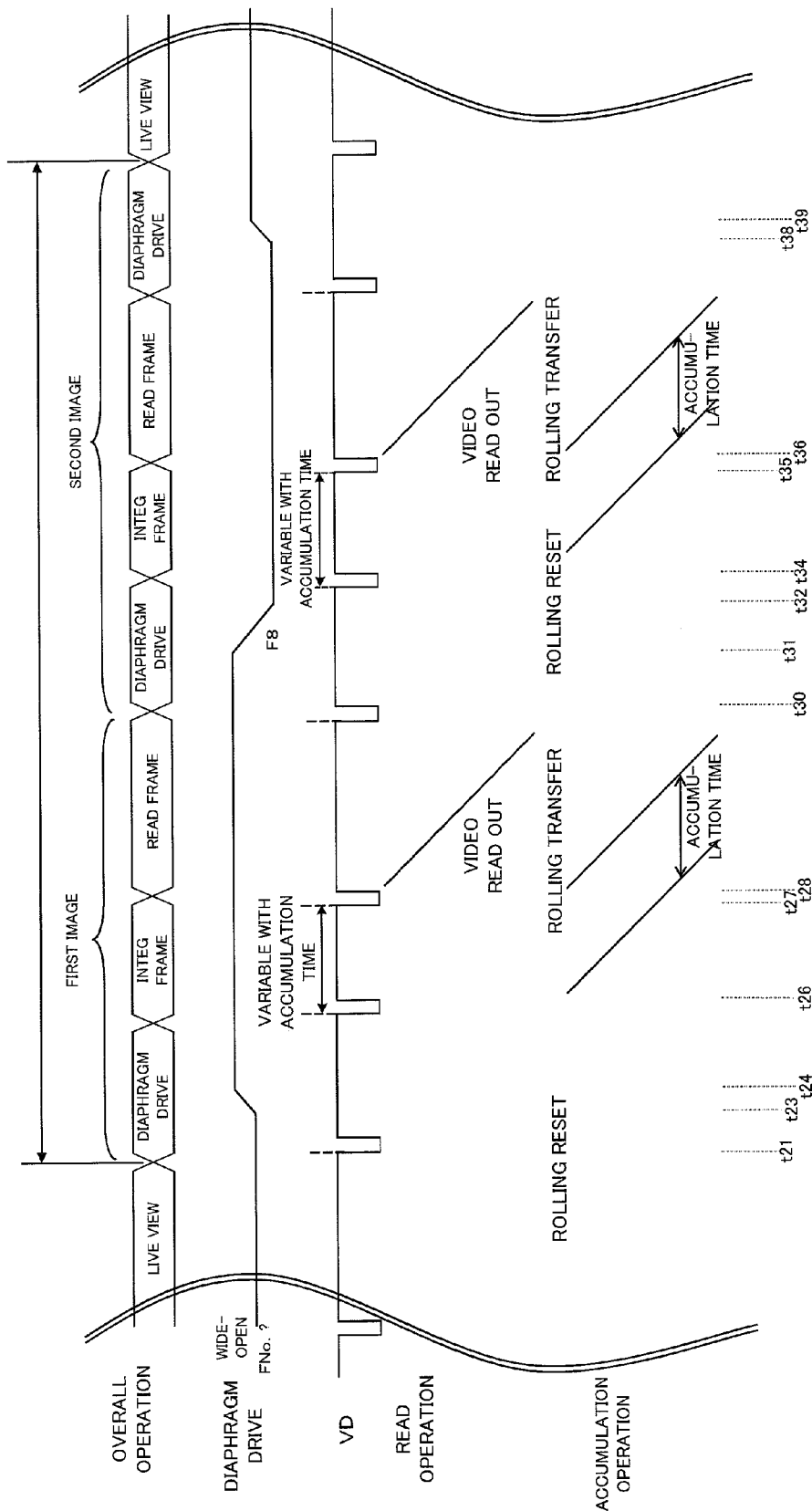
FIG. 14 is a timing chart at the time of a shooting operation of modified example 1, in the digital camera of the first embodiment of the present invention.

In the case where this image sensor 107 of modified example 1 is used, shooting is carried out with a rolling shutter instead of a global shutter at the time of shooting. This operation at the time of shooting will be described using the timing chart shown in FIG. 14. This timing chart is equivalent to the timing chart of FIG. 13 for the first embodiment of the present invention.

If the exposure operation of modified example 1 is entered, together with VD being set to L level (t21) the diaphragm is driven towards a wide-open value (time t23-t24). Once a wide-open state has been reached, an accumulation operation of photoelectric current output from the photodiodes of the image sensor 107 by the rolling shutter into the floating diffusion MEM is commenced (time t26).

Once the shutter speed (accumulation time) for achieving appropriate exposure with wide-open aperture is reached, the accumulation operation is completed (time t27). Since there is a rolling shutter, start of accumulation and end of accumulation at the same time for all pixels does not happen, and accumulation is started and ended for each line a little at a time. However, the accumulation time is the same for all pixels.

Even if accumulation time has not elapsed for all pixels, if accumulation time for the pixels that started accumulation initially is complete, read out of image data 1 (image signal) is started (time t28), and reading is carried out for every line.

If read out of image data 1 is complete, the diaphragm is next stopped down to a specified aperture value (F8 in the illustrated example) (time t31-t32). Then, similarly to time t26-t27, an accumulation operation of photoelectric current output from the photodiodes of the image sensor 107 due to the rolling shutter into the floating diffusion MEM is carried out. Once the accumulation operation is complete, read out of image data 2 is commenced (time t36) and the wide-open aperture is returned to (time t38-t39).

In this way, with modified example 1 two image data for different aperture values are acquired in a single shot, using the rolling shutter. Using the two acquired image data it is possible to carry out bokeh enhancement processing similarly to the first embodiment of the present invention.

Next, a modified example 2 of the image sensor 107 of the first embodiment of the present invention that combines a global shutter and a rolling shutter will be described. The image sensor 107 used with this modified example 2 is an image sensor of global shutter type that was described using FIG. 19. In the case of using a global shutter, a total of five transistors are used, while in the case of using a rolling shutter, of the five transistors transistor Tr1 is not used.

Figure 15:
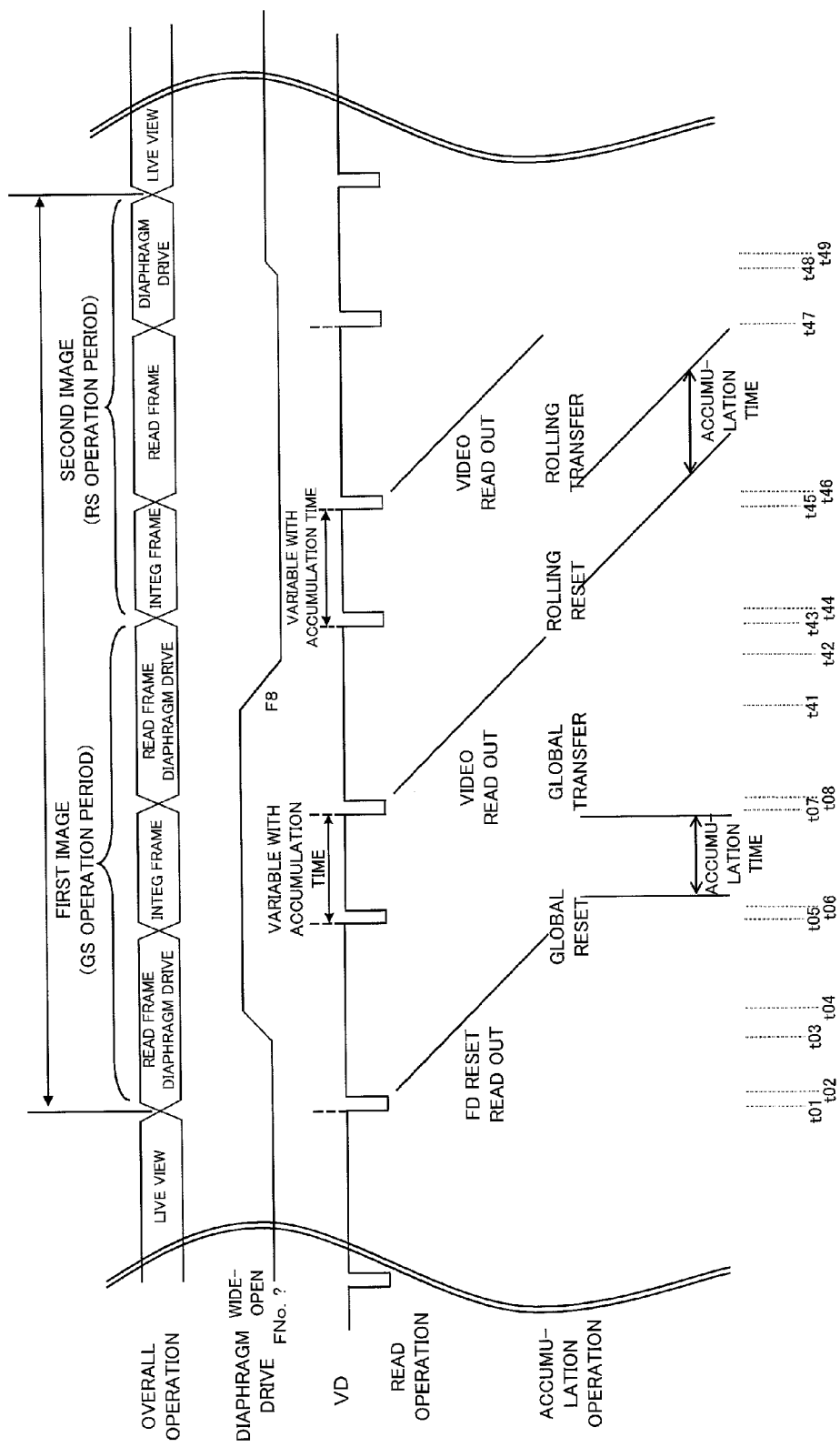
FIG. 15 is a timing chart at the time of a shooting operation of modified example 2, in the digital camera of the first embodiment of the present invention.

Operation of modified example 2 at the time of shooting will be described using the timing chart shown in FIG. 15. This timing chart is equivalent to the timing chart of FIG. 13 for the first embodiment of the present invention.

Shooting a first image with modified example 2 is carried out using the global shutter, to acquire image data in a wide-open state. This first shooting is the same as that from time t01 to time t08 in FIG. 13, and so the same reference numerals are assigned to the same times, and detailed description is omitted.

However, at the time of the first shooting, during the read out of image data 1 carried out from time t08, a stopping down operation is carried out (time t41-t42). In the first embodiment of the present invention, the stopping down was carried out during FD reset read out for the second shot, but in modified example 2 since the second shot taken with a rolling shutter, stopping down is carried out during readout of the first image data 1.

Once stopping down is complete, if VD is set to L level and then returned to H level (time t44), an accumulation operation of photoelectric current output of the photodiodes of the image sensor 107 due to the rolling shutter into the floating diffusion MEM is carried out (time t44-t46). Once the accumulation operation is complete, read out of image data 2 is commenced (time t46) and the wide-open aperture is returned to (time t48-t49).

In this way, with modified example 2 of the first embodiment, two image data for different aperture values are acquired in a single shot, by combining the global shutter and the rolling shutter. Using the two acquired image data it is possible to carry out bokeh enhancement processing similarly to the first embodiment of the present invention.

Figure 16:
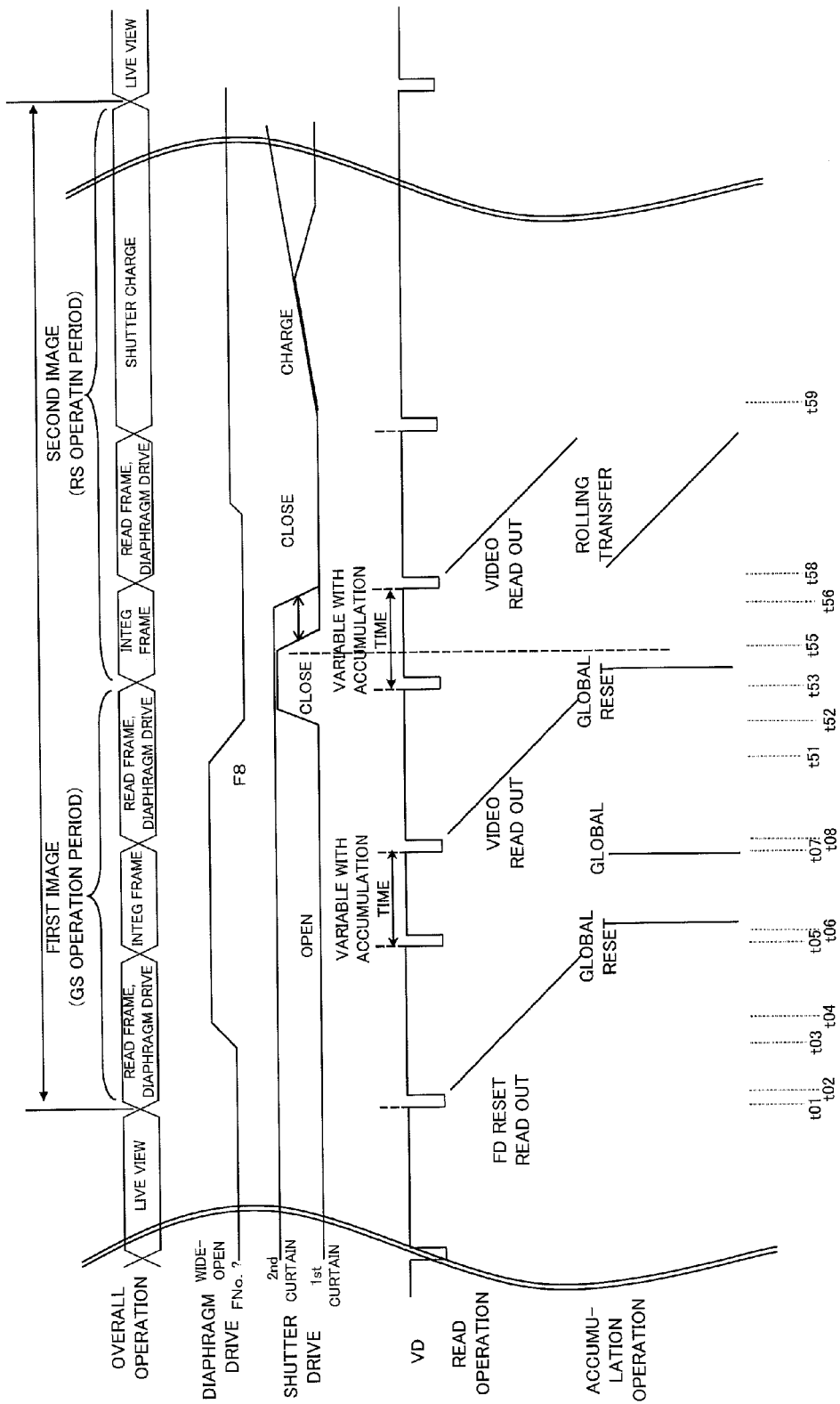
FIG. 16 is a timing chart at the time of a shooting operation of modified example 3, in the digital camera of the first embodiment of the present invention.

Next, a modified example 3 of the image sensor 107 of the first embodiment of the present invention that combines a global shutter and a rolling shutter will be described using the timing chart shown in FIG. 16. The image sensor 107 used with this modified example 3 is the same as for modified example 2, and is shown in FIG. 19.

Also, with modified example 3, in the structure shown in FIG. 1 a normally open type focal plane shutter is arranged between the photographing lens 101 and the image sensor 107. The position of this mechanical shutter can be anywhere as long as it is positioned between those two sections, but since it has first and second shutter curtains it is preferably directly in front of the image sensor 107. A normally open type mechanical shutter is in a wide-open state in its normal state, and after charging the shutter the shutter is closed once a release operation is performed.

Shooting a first image with modified example 3 is also carried out using the global shutter, similarly to modified example 2, to acquire image data in a wide-open state. This first shooting is the same as that from time t01 to time t08 in FIG. 13, and so the same reference numerals are assigned to the same times, and detailed description is omitted.

Also, at the time of the first shot, similarly to modified example 2, a stopping down operation is carried out during read out of image data 1 that is carried out from time t08 (time t51-t52). In the case of modified example 3, in addition to setting to wide open, the first curtain of the normally open type focal plane shutter is closed (time t52). This state is a shutter closed state, and a global reset of the image sensor 107 is carried out at the time of this closed state.

Then, the first curtain of the normally open type focal plane shutter is moved (time t55), the second curtain of the shutter is moved at a point in time when a time corresponding to the calculated shutter speed has elapsed (time t56), and a shutter closed state is entered. After that, read out of image data 2 from the image sensor 107 is commenced (time t58), and charging of the normally open type shutter is carried out (time t59).

In this way, with modified example 3, exposure time of the first shot is controlled by the global shutter of the image sensor 107, but exposure time of the second shot is controlled by the normally open type focal plane shutter. However, at the time of the second shot the charge accumulation for the image sensor 107 is carried out using the rolling shutter.

With this modified example, a normally open type plane shutter is used, and when the first shot is completed the shutter curtain moves and generates a shutter noise. However, since the shutter sound only occurs once when transitioning from the first shot to the second shot, it will not cause the photographer to feel uneasy.

Figure 17:
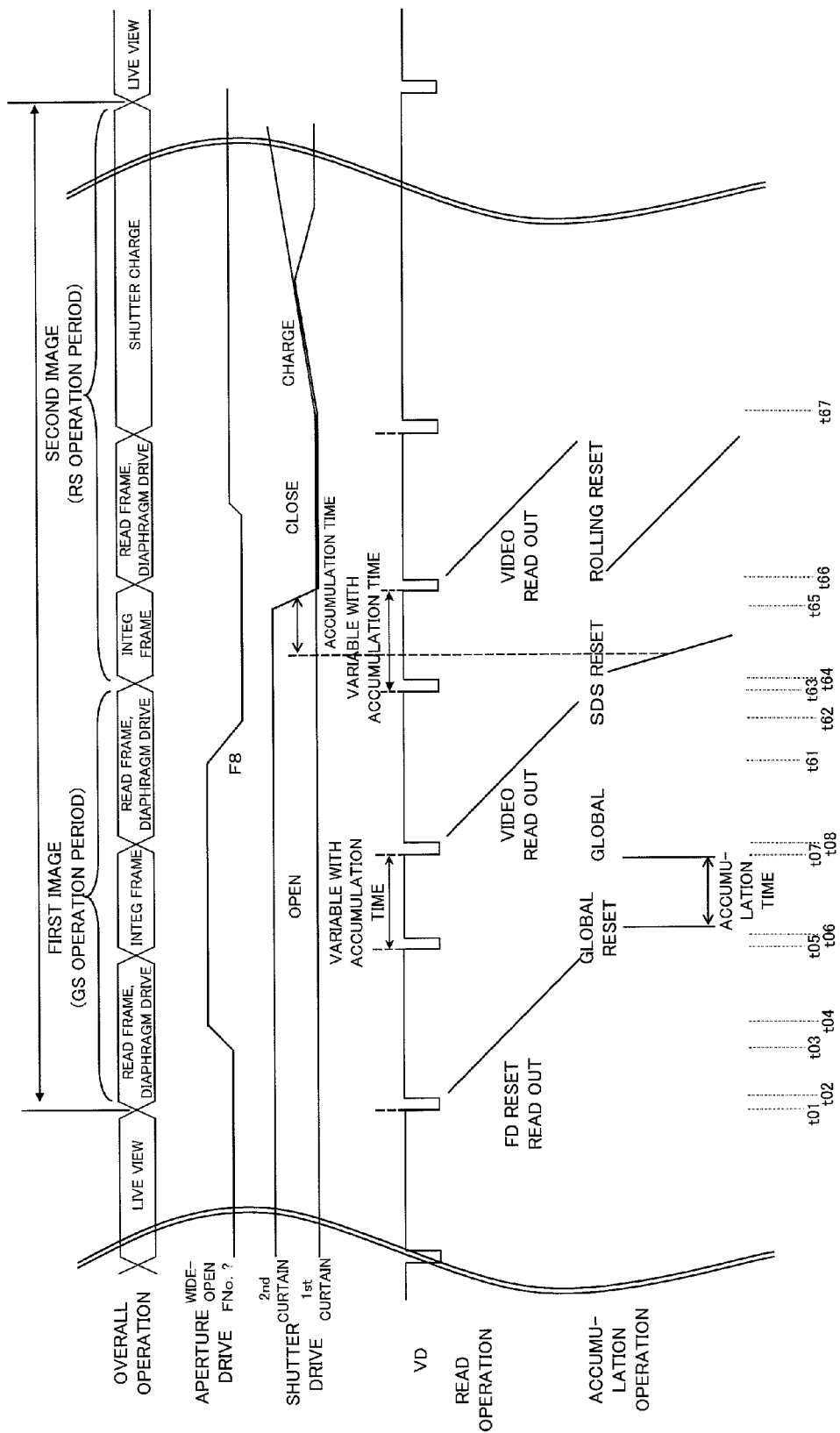
FIG. 17 is a timing chart at the time of a shooting operation of modified example 4, in the digital camera of the first embodiment of the present invention.

Next, a modified example 4 of the image sensor 107 of the first embodiment of the present invention that combines a global shutter and a rolling shutter will be described, using the timing chart shown in FIG. 17. The image sensor 107 and the normally open type focal plane shutter are the same as in modified example 3.

Shooting a first image with modified example 4 is also carried out using the global shutter, similarly to modified examples 2 and 3, to acquire image data in a wide-open state. This first shooting is the same as that from time t01 to time t08 in FIG. 13, and so the same reference numerals are assigned to the same times, and detailed description is omitted.

Also, at the time of the first shot, similarly to modified examples 2 and 3, a stopping down operation is carried out during read out of image data 1 that is carried out from time t08 (time t61-t62). Once the stopping down operation is complete the image sensor 107 carries out a reset for each line at the same speed as the speed of the shutter curtain and in the same direction as the direction of movement of the shutter curtain (hereafter this resetting so as to mimic the front curtain will be referred to as "SDS reset") (time t64). In this way each line of pixels of the image sensor 107 is sequentially reset with a time difference.

Then, after SDS reset has commenced, the second curtain of the shutter is moved at a point in time when a time corresponding to the calculated shutter speed has elapsed (time t65), and a shutter closed state is entered. After that, read out of image data 2 from the image sensor 107 is commenced (time t66), and charging of the normally open type shutter is carried out (time t67).

In this way, with modified example 4, exposure time of the first shot is controlled by the global shutter of the image sensor 107, but exposure time of the second shot is controlled by SDS reset and the second curtain of the normally open type focal plane shutter.

Figure 18:
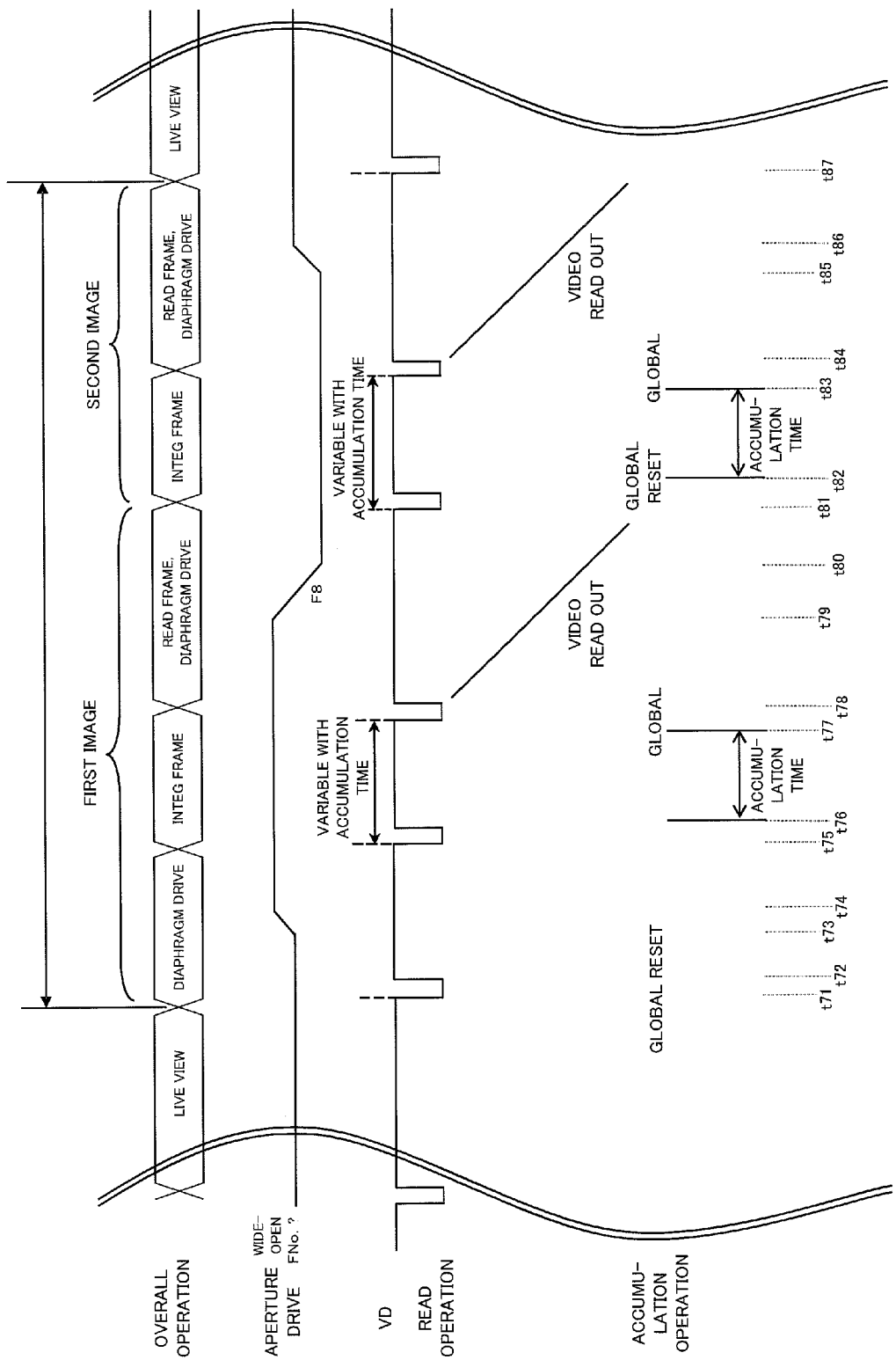
FIG. 18 is a timing chart at the time of a shooting operation of modified example 5, in the digital camera of the first embodiment of the present invention.

Next, a modified example 5 of the image sensor 107 of the first embodiment of the present invention that combines a global shutter and a rolling shutter will be described, using the timing chart shown in FIG. 18. The outline structure of a pixel of the image sensor 107 used with modified example 5 will be described using FIG. 21. A circuit for a single pixel of the image sensor 107 is made up of a photodiode PD constituting a single pixel, a floating diffusion MEN that is a storage section for photoelectric conversion current, and 7 transistors Tr21-Tr27.

Figure 21:
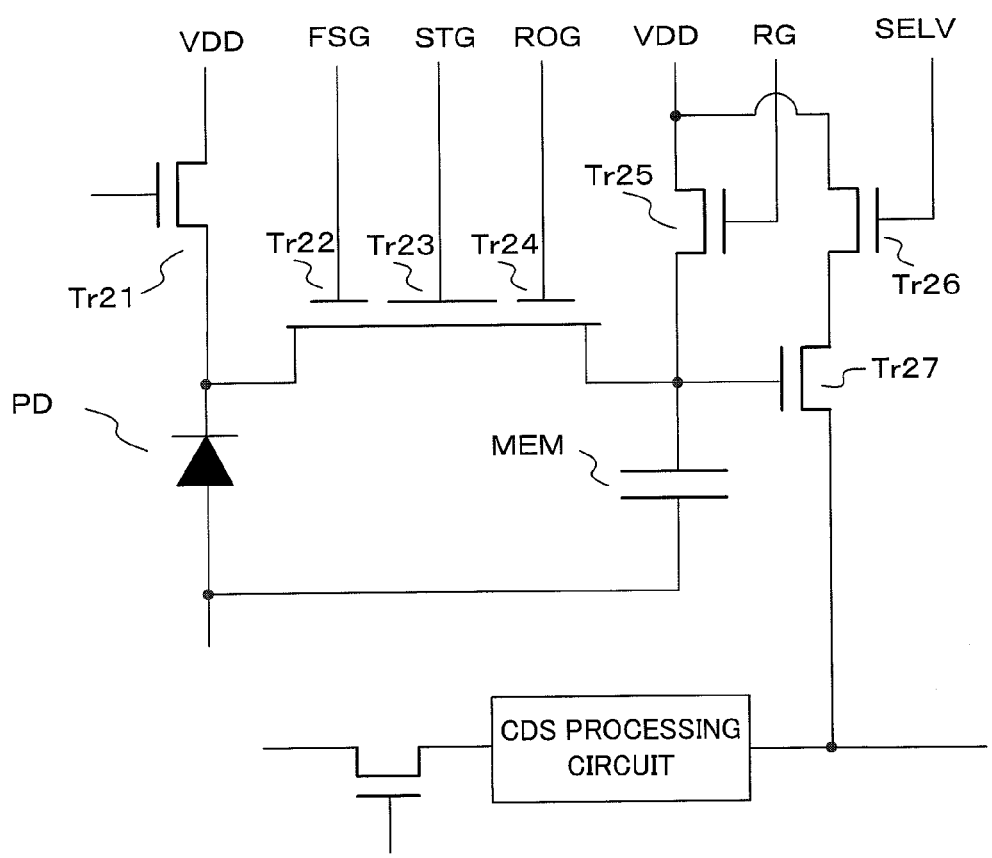
FIG. 21 is a drawing showing the circuit structure for a single pixel of an image sensor of modified example 5 in the digital camera of the first embodiment of the present invention.

Compared to the image sensor 107 having the global shutter shown in FIG. 19 described previously, broadly speaking the transistor Tr1 of FIG. 19 is equivalent to transistor Tr21 of FIG. 21, transistor Tr2 is equivalent to transistors Tr22, Tr23 and Tr24, transistor Tr3 is equivalent to transistor Tr25, and transistor Tr4 is equivalent to transistor Tr27.

The structure and operation of the image sensor 107 of this modified example 5 are disclosed in paragraphs [0086] to [0106] of Japanese patent laid-open No. 2004-282552, and so these disclosures are incorporated here and detailed description will be omitted. However, in this commonly known art a transistor corresponding to TR21 is omitted but the function of that transistor is the same as that of transistor Tr1 of FIG. 19.

In the case where this image sensor 107 of modified example 5 is used, shooting is carried out with a global shutter at the time of shooting. Operation at the time of shooting will be described using the timing chart shown in FIG. 18. This timing chart is equivalent to the timing chart of FIG. 13 for the first embodiment of the present invention. Compared to the image sensor 107 of the first embodiment of the present invention, the image sensor 107 of modified example 5 is different only in that FD reset readout has been made unnecessary. Description will therefore center on points of difference from the timing chart of the first embodiment shown in FIG. 13.

In the first embodiment, for the first shot read out of an FD reset level was carried out during time t01-t05, but with modified example 5 only drive to the wide-open state is carried out during time t73-t74. Accumulation of photoelectric current of the image sensor 107 is then carried out during time t76-t77.

After that, similarly to the first embodiment, as well as carrying out image signal readout from the image sensor 107, stopping down is carried out (time t79-t80). Taking of the second shot is then entered, accumulation of photoelectric current is carried out (time t82), and once accumulation is complete image signal read out is performed (time t84 onwards) and the diaphragm is returned to the state at the time of live view display (time t85-t86).

As has been described above, with the first embodiment and modified examples of the present invention, a system control section 116 functioning as a shooting control section performs shooting of a first image at a first aperture value (wide-open aperture value) in response to a release instruction (S21, S22), then, after completion of shooting the first image, reads out first image data from an imaging section while simultaneously carrying out a diaphragm drive operation to a second aperture value (S23), performs shooting of a second image at this second aperture value (S24), reads out second image data from the imaging section after this shooting is completed (S25), and finally detects difference amounts for contrast values for each location of the first image data and the second image data to carry out processing to blur at an intensity of blurring corresponding to an amount of change at each location in the first and second image data (S35-S44). It is therefore possible to carry out bokeh processing with a natural feeling and without incongruity at the time of shooting.

Also, the image sensor 107 is comprised of photoelectric conversion elements (PD) corresponding to each pixel, and a charge accumulation section (floating diffusion MEM), and exposure time for shooting of the first image and the second image is controlled by controlling accumulation time of the charge accumulation section. Since exposure time is not controlled by a mechanical shutter, there are not two shutter sounds at the time of acquiring two image data, and the photographer is not made to feel uneasy.

In the first embodiment and modified examples of the present invention, when acquiring two images with differing aperture values, bokeh processing was carried out using two aperture values of wide-open and F8. However, this is only an example, and it is also possible to use other aperture values. Also, if bokeh processing is carried out using three or more images of differing aperture value it is possible to further improve the precision of bokeh processing.

Also, with the first embodiment and modified examples of the present invention, bokeh processing is carried out in the camera 100, but it is also possible to store the two image data and carry out the bokeh processing by executing the processing flow shown in FIG. 4 on an image processing device such as a PC.

Figure 22:
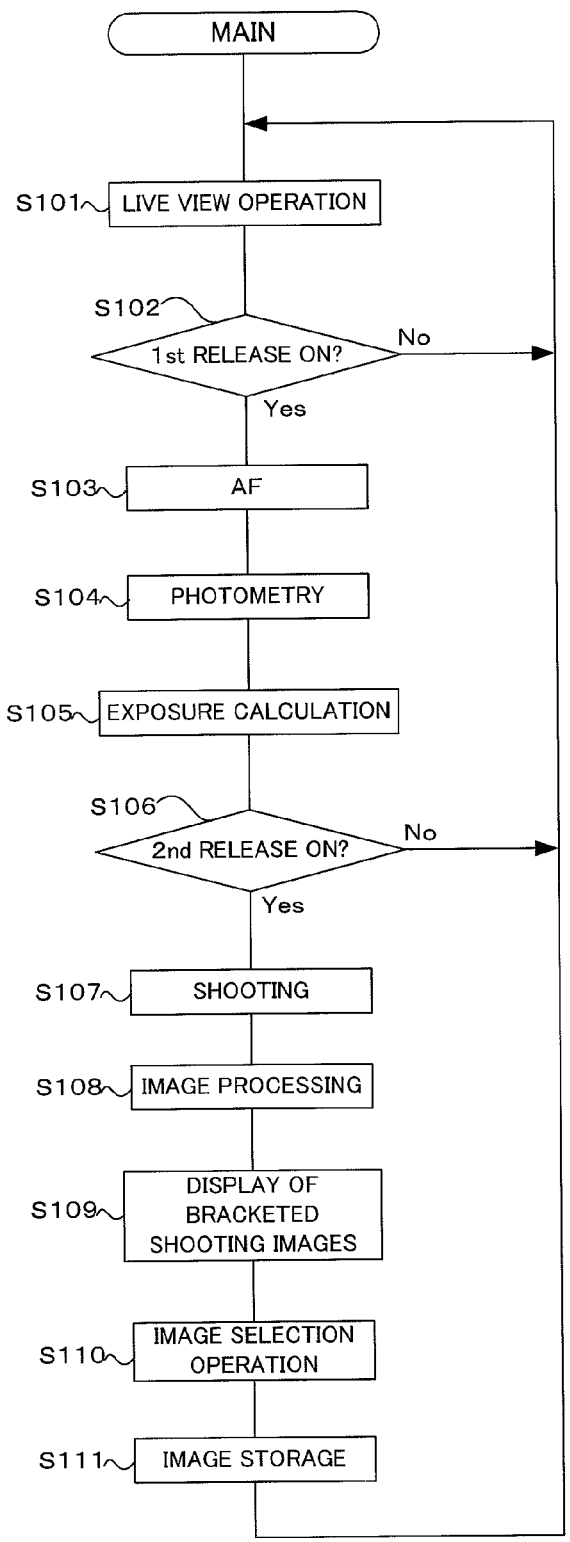
FIG. 22 is a flowchart showing a main operation of the digital camera of a second embodiment of the present invention.
Figure 23:
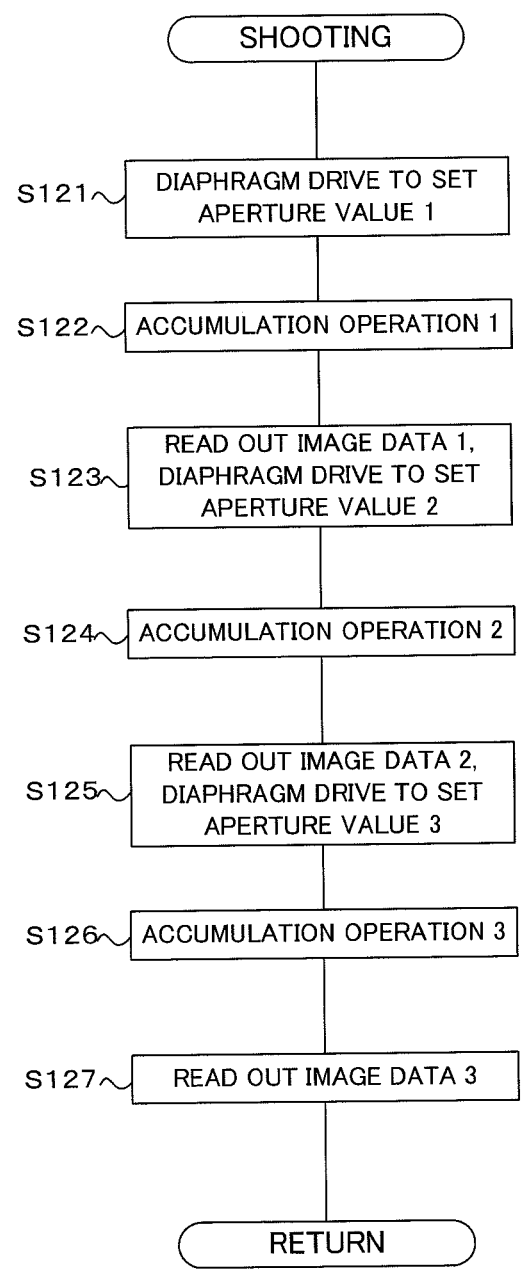
FIG. 23 is a flowchart showing a shooting operation of the digital camera of the second embodiment of the present invention.

Next, a second embodiment of the present invention will be described using FIG. 22 to FIG. 24. In the first embodiment of the present invention, for an identical shot two image data with differing aperture values were obtained, and bokeh processing giving a natural effect was applied by carrying out blurring processing using the acquired image data. In contrast to this, the second embodiment shows an example of the present invention applied to bracketed exposure.

Bracketed exposure is a way of shooting in which the same scene is shot at different exposures for a plurality of frames. According to this type of bracketed exposure, it is possible to perform shooting with minute variations at times such as when it is not possible to determine whether exposure is optimum or not, which enables foolproof shooting. However, carrying out shooting for multiple frames has a problem in that the time required for shooting becomes long giving bad usability. With this embodiment, therefore, in response to a release instruction, similarly to the first embodiment sequential shooting of a series of shots is carried out, so that the time required for bracketed exposure is not prolonged.

The electrical circuitry of this embodiment is substantially the same as the block diagram shown in FIG. 1, and so detailed description is omitted. The camera 100 has a bracketed exposure mode, and it is possible for the photographer to set the camera into bracketed exposure mode by displaying a menu screen etc. on the display section 115 and operating the operation section 117. At the time of bracketed exposure, exposure parameters for bracketed exposure are calculated according to detailed settings of the bracketed exposure mode.

Exposure parameters that are changed at the time of bracketed exposure, besides aperture, are shutter speed (charge accumulation time of the image sensor 107) and sensitivity. In this embodiment, aperture bracketed exposure mode where shots are taken while varying aperture will be described.

Next, operation of the camera 100 of this embodiment will be described using the flowcharts shown in FIG. 22 and FIG. 23, and the timing chart shown in FIG. 24. This processing flow, similarly to the first embodiment, is executed by the system control section 116 in accordance with programs stored in the non-volatile memory 118. The processing flow shown in FIG. 22 is the main routine, and execution commences if the power supply button of the operation section 117 is turned on.

If the main routine is entered, live view operation is carried out (S101), it is determined whether or not a first release is on (S102), AF operation is carried out (S103), and a photometry operation is carried out (S104). The processing in these steps S101 to S104 is the same as steps S1-S4 in the main routine shown in FIG. 2, and so detailed description is omitted.

Once the photometry operation has been carried out, exposure calculation is carried out (S105). In this step calculation of subject brightness is executed in the exposure control section 112, and exposure control values such as aperture value and shutter speed (accumulation time) are obtained using the calculated subject brightness. Aperture values corresponding to exposure amounts that are reduced by a specified exposure amount with respect to the optimum exposure are also calculated.

Specifically, a set aperture value 1 for over exposure by a specified amount, a set aperture value 2 for optimum exposure, and s ET aperture value 3 for under exposure by a specified amount are calculated. Regarding accumulation time at the time of aperture bracketed exposure mode shooting, exposure is carried out with accumulation time fixed at that calculated as optimum exposure. As a specified amount, bracketed exposure can use a difference in aperture value of an extent that results in a general exposure difference.

Once exposure calculation has been carried out, it is next determined whether or not the release button of the operation section 117 has been pressed down fully, that is, whether or not the second release is on (S106). If the result of this determination is that the second release is not on, processing returns to step S101. On the other hand, if the second release is on, there is a transfer of control to processing for shooting, in step 107 and after.

First, exposure is carried out (S107). Here, aperture values are changed to the set aperture value 1 to achieve over exposure, set aperture value 2 to achieve optimum exposure, and set aperture value 3 to achieve under exposure, and charge accumulation and image signal read out of the image sensor 107 are carried out at those respective set aperture values. Detailed operation of this shooting will be described later using the flowchart shown in FIG. 23, and the timing chart shown in FIG. 24.

If shooting is complete, image processing is carried out (S108). Here, general image processing is carried out, to generate images for three different aperture values (specifically set aperture values 1-3). It is also possible to generate an image of an intermediate aperture value using bokeh simulation.

Once image processing has been carried out, bracketed shooting image display is next carried out (S109). Here, a plurality of images acquired by the image processing of step S108, that is images of three different aperture values, are displayed on the display section 115.

Once bracketed shooting image display has been carried out, an image selection operation is carried out (S110). From among the plurality of images that were displayed in step S109, the image the photographer considers to have the optimum exposure is selected by operating an operation switch of the operation section 117. Here in this step, which image has been selected is detected.

If the image selection operation is complete, image storage is carried out next (S111). Here, the image that was selected in step S110 is stored in the external memory 114. Once image storage is finished, processing returns to step S101.

Next, the shooting operation of the step S107 will be described using the flowchart shown in FIG. 23, and the timing chart shown in FIG. 24. The shooting operation of this embodiment is based on the shooting operation of FIG. 13, with description of common steps omitted and steps that are different being described.

If the shooting operation is entered, drive to set aperture value 1 is first carried out (S121). Here the diaphragm control section 104 controls the diaphragm 103 so as to reach the set aperture value 1 for over exposure, from optimum exposure. Also, in parallel with this aperture drive, read out of the FD reset level of the image sensor 107 is carried out (refer to FIG. 24: t92-t95).

Once the aperture value has reached set aperture value 1, an accumulation operation 1 is carried out (S122). Here an accumulation operation of the image sensor 107 is carried out during an accumulation time (shutter speed) for optimum exposure that was calculated in step S105 (refer to FIG. 24: t96-t97).

Figure 24:
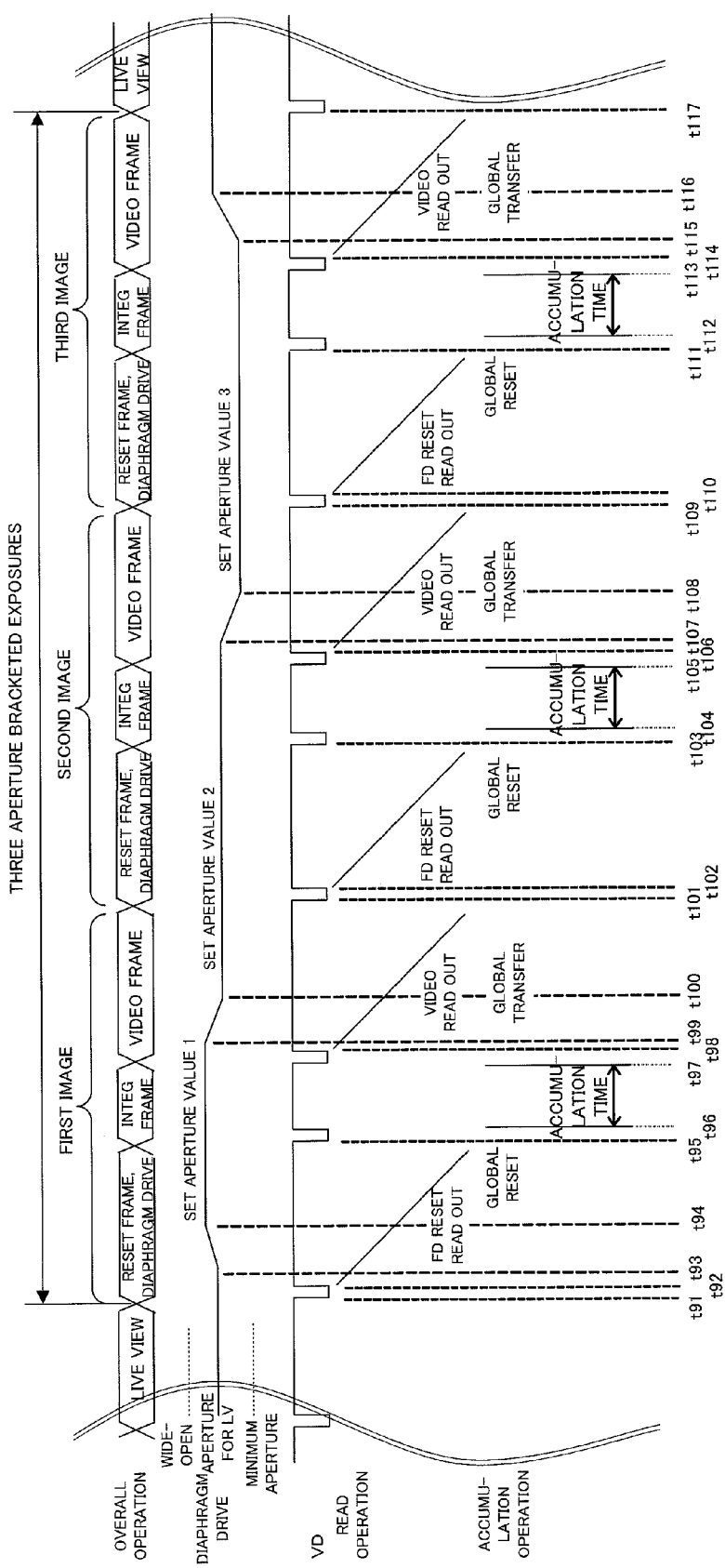
FIG. 24 is a timing chart at the time of a shooting operation, in the digital camera of the second embodiment of the present invention.

If the accumulation operation 1 is complete, image data 1 is read out and drive to set aperture value 2 is carried out (S123) Here image data 1 is read out from the image sensor 107 (refer to FIG. 24: t98-t101). Also, in parallel with this image data 1 read out operation, drive to set aperture value 2 to achieve optimum exposure is carried out (refer to FIG. 24: t99-t100). If read out of image data 1 is complete, read out of FD reset level of the image sensor 107 is carried out (refer to FIG. 24: t102-t103).

If image data 1 readout and drive to the set aperture value 2 have been carried out, accumulation operation 2 is next carried out (S124). Here an accumulation operation of the image sensor 107 is carried out during an accumulation time for optimum exposure that was calculated in step S105 (refer to FIG. 24: t104-t105).

If the accumulation operation 2 is complete, image data 2 is read out, and drive to set aperture value 3 is carried out (S125) Here image data 2 is read out from the image sensor 107 (refer to FIG. 24: t106-t109). Also, in parallel with the read out of image data 2, drive to set aperture value 3 for achieving under exposure is carried out (refer to FIG. 24: t107-t108). If read out of image data 2 is complete, read out of FD reset level of the image sensor 107 is carried out (refer to FIG. 24: t110-t111).

If image data 2 read out and drive to the set aperture value 3 have been carried out, accumulation operation 3 is next carried out (S126). Here an accumulation operation of the image sensor 107 is carried out during an accumulation time for optimum exposure that was calculated in step S105 (refer to FIG. 24: t112-t113).

Once the accumulation operation 3 is completed, image data 3 is read out (S127). Here image data 3 is read out from the image sensor 107 (refer to FIG. 24: t114-t117). Also, in parallel with the read out of image data 3, drive of the diaphragm for live view display is carried out (refer to FIG. 24: t115-t116). In this embodiment this is to the wide-open value. Once image data 3 read out is finished, the shooting operation is completed and the originating processing flow is returned to.

In this way, in this embodiment image data is acquired at the time of bracketed shooting while changing aperture value, and using this image data images taken in bracketed exposure are displayed and the photographer stores a selected image in the external memory 114. In a bracketed exposure operation, therefore, it is possible to reduce the processing time, and to improve usability. Also, with this embodiment a shutter sound is not generated three times in order to acquire image data for three images, and the photographer is not made to feel uneasy.

In this embodiment there are three set aperture values, but it is also possible to set two aperture values, or four or more aperture values when acquiring images.

Figure 25:
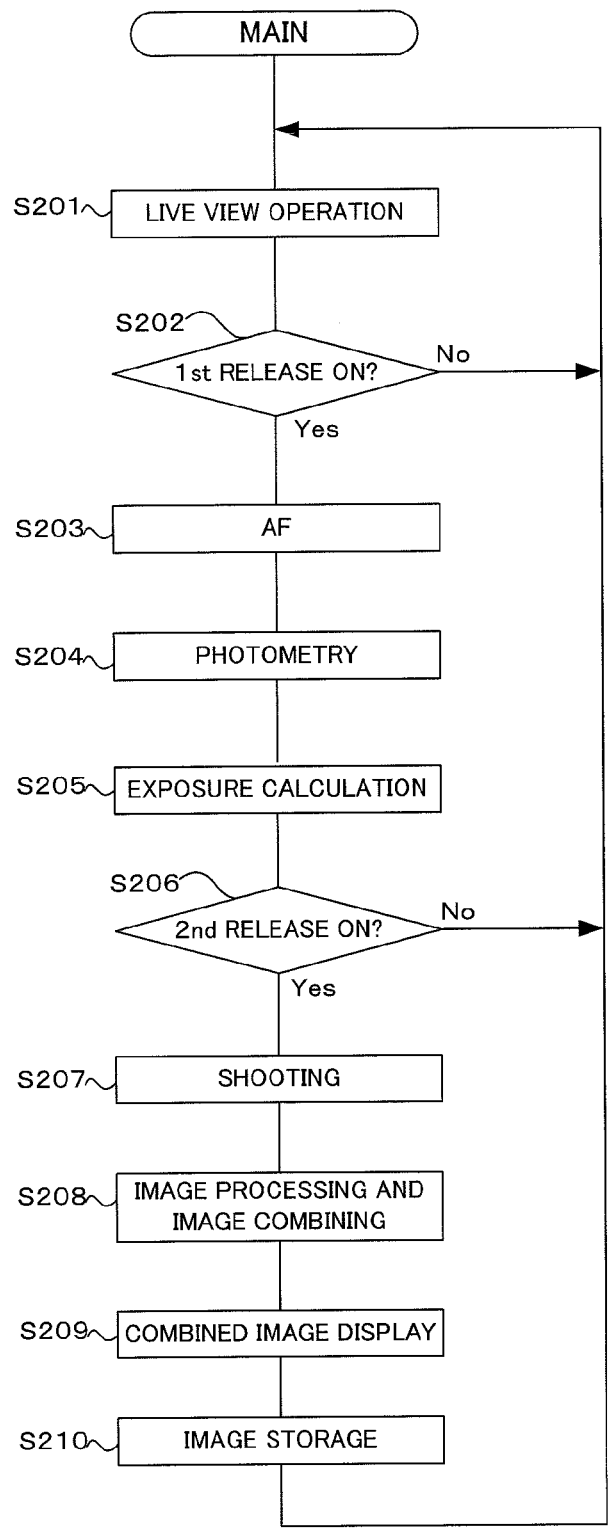
FIG. 25 is a flowchart showing a main operation of a digital camera of a third embodiment of the present invention.
Figure 26:
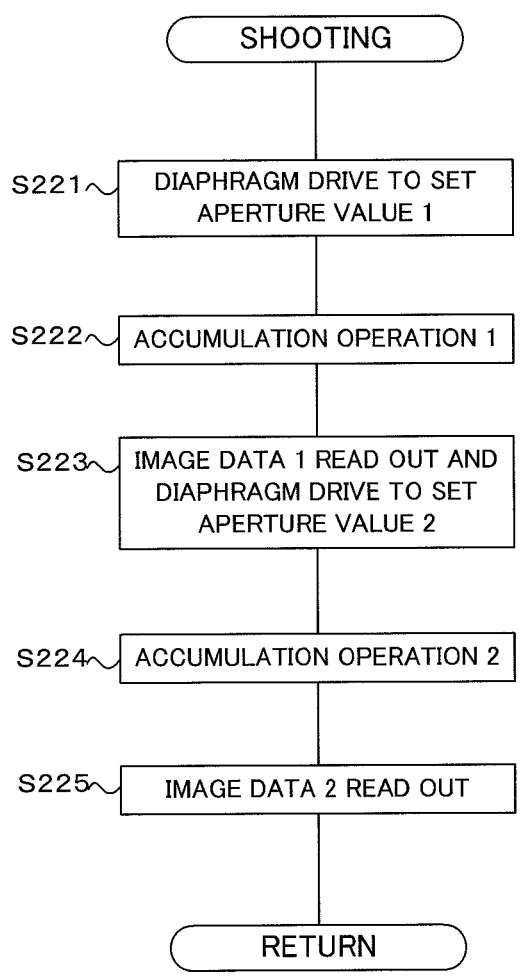
FIG. 26 is a flowchart showing a shooting operation of the digital camera of the third embodiment of the present invention.

Next, a third embodiment of the present invention will be described using FIG. 25 to FIG. 27. In the previously described second embodiment an example of the present invention applied to bracketed exposure was described. The third embodiment is an example of the present invention applied to wide dynamic range exposure.

Techniques combining two images taken of the same scene but having different exposure amounts to generate a composite image having a wide dynamic range have been known. For example, saturated portions in an image signal resulting from exposure with a large exposure amount are converted to image signals resulting to exposure with a small exposure amount, and by carrying out gain correction by comparing exposure amounts at the time of this conversion a composite image signal having a wide dynamic range is obtained.

However, since multiple shots are taken there is a problem in that the time required for shooting becomes long, giving bad usability. Also, in order to acquire two image data, the photographer will hear two shutter sounds for one exposure, and in the case of a camera having mechanical sounds, such as a movable mirror and focal plane shutter mechanism, there is a problem that a strong sense of discomfort is generated.

In this embodiment therefore, exposure with large exposure amount and exposure with small exposure amount are carried out, and when performing wide dynamic range shooting imaging is performed twice consecutively while changing aperture value, to alleviate the above described problem.

The electrical circuitry of this embodiment is substantially the same as the block diagram shown in FIG. 1, and so detailed description is omitted. The camera 100 has a wide dynamic range exposure mode, and it is possible for the photographer to set the camera into wide dynamic range exposure mode by displaying a menu screen etc. on the display section 115 and operating the operation section 117.

In addition to normal image processing, the image processing section 111 of this embodiment combines first image data and second image data, and combines image data having an expanded dynamic range.

Next, operation of the camera 100 of this embodiment will be described using the flowcharts shown in FIG. 25 and FIG. 26, and the timing chart shown in FIG. 27. This processing flow, similarly to the first embodiment, is executed by the system control section 116 in accordance with programs stored in the non-volatile memory 118. The processing flow shown in FIG. 25 is the main routine, and execution commences if the power supply button of the operation section 117 is turned on.

If the main routine is entered, live view operation is carried out (S201), it is determined whether or not a first release is on (S202), AF operation is carried out (S203), and a photometry operation is carried out (S204). The processing in these steps S201 to S204 is the same as steps S1-S4 in the main routine shown in FIG. 2, and so detailed description is omitted.

Once the photometry operation has been carried out, exposure calculation is carried out (S205). In this step two exposure parameters for achieving different exposure are calculated. For example, a set aperture value 1 and accumulation time 1 to achieve optimum exposure for bright portions of a subject, and a set aperture 2 and accumulation time 2 to achieve optimum exposure for mid to low brightness portions of a subject are calculated.

Once exposure calculation has been carried out, it is next determined whether or not the release button of the operation section 117 has been pressed down fully, that is, whether or not the second release is on (S206). If the result of this determination is that the second release is not on, processing returns to step S201. On the other hand, if the second release is on, there is a transfer of control to processing for shooting, in step 207 and after.

First, wide dynamic range shooting is carried out (S207). Here, exposure with the set aperture value 1 and the accumulation time 1 to achieve optimum exposure in high brightness portions is carried out, and once that exposure is finished charge accumulation and image signal readout of the image sensor 107 are carried out. Then, once the first exposure is finished, exposure with the set aperture value 2 and accumulation time 2 to achieve optimum exposure in the mid to low brightness portions is carried out, and once exposure is complete charge accumulation and image signal readout for the image sensor 107 are carried out. Detailed operation of this shooting will be described later using the flowchart shown in FIG. 26, and the timing chart shown in FIG. 27.

If shooting is finished, image processing and image combination are carried out (S208). Here respective image processing is carried out for the taken images, in which image signals are gain corrected according to a ratio of exposure amounts, and combined to generate an image having a wide dynamic range. Specifically, in this embodiment two images are acquired in step S207, and these two images are combined to generate a wide dynamic range image.

Once image processing and image combination are finished, combined image display is carried out (S209). Here, the image resulting from combination in step S208 is displayed on the display section 115. Once combined image display has been carried out, image storage is carried out (S210). Here, the image on the combined image generated in step S208 is stored in the external memory 114. Once image storage is finished, processing returns to step S201.

Next, the shooting operation of the step S207 will be described using the flowchart shown in FIG. 26, and the timing chart shown in FIG. 27. The shooting operation of this embodiment, similarly to previously described FIG. 23, is based on the shooting operation of FIG. 13, with description of common steps omitted and steps that are different being described.

If the shooting operation is entered, drive to set aperture value 1 is first carried out (S221) Here the diaphragm control section 104 performs drive control of the diaphragm 103 so as to reach the set aperture value 1 for optimum exposure for high brightness portions (refer to FIG. 27: t123-t124). Also, in parallel with this aperture drive, read out of the FD reset level of the image sensor 107 is carried out (refer to FIG. 27: t122-t125).

Once the aperture value has reached set aperture value 1, an accumulation operation 1 is carried out (S222). Here an accumulation operation of the image sensor 107 is carried out during an accumulation time (shutter speed) for optimum exposure for high brightness portions that was calculated in step S205 (refer to FIG. 27: t126-t127).

If the accumulation operation 1 is finished, image data 1 is read out and drive to set aperture value 2 is carried out (S223) Here image data 1 is read out from the image sensor 107 (refer to FIG. 27: t128-t131). Also, in parallel with this image data 1 read out operation, drive to set aperture value 2 to achieve optimum exposure at mid to low brightness portions is carried out (refer to FIG. 27: t129-t130). If read out of image data 1 is complete, read out of FD reset level of the image sensor 107 is carried out (refer to FIG. 27: t132-t133).

If image data 1 read out and drive to the set aperture value 2 have been carried out, accumulation operation 2 is next carried out (S224). Here an accumulation operation of the image sensor 107 is carried out during an accumulation time for optimum exposure for mid to low brightness portions that was calculated in step S205 (refer to FIG. 27: t134-t135).

Once the accumulation operation 2 has been completed, this image data 2 is next read out (S225). Here image data 2 is read out from the image sensor 107 (refer to FIG. 27: t136-t139). Also, in parallel with the read out of image data 2, drive of the diaphragm 103 for live view display is carried out (refer to FIG. 27: t137-t138). In this embodiment this is to the wide-open value. Once image data 2 read out is finished, the shooting operation is completed and the originating processing flow is returned to.

In this way, in this embodiment image data is acquired at the time of a wide dynamic range exposure operation while changing aperture value, and using this image data a wide dynamic range image is composed and this image is stored in the external memory 114. As a result, when carrying out the wide dynamic range exposure operation it is possible to shorten the processing time, and it is possible to improve usability. Also, with this embodiment, a shutter sound is not emitted twice in order to acquire two image data, and the photographer is not made to feel uneasy.

In this embodiment there are two set aperture values, but it is also possible to set three or more aperture values when acquiring images. For example, in the case of setting three aperture values, accumulation time is controlled to give respective optimum exposures for the high brightness portions, mid brightness portions and low brightness portions.

As has been described above, with each of the embodiments and modified examples of the present invention, if a release button is pressed down fully and an exposure operation commences, an accumulation operation for a set aperture 1 is carried out, and image data is read out once the accumulation operation is finished. Also, in parallel with the image data read out, diaphragm drive to a set aperture value 2 is carried out, and once the accumulation operation is finished image data is read out. In the case of a set aperture value 3, these operations are repeated. As a result, even in a case where it is necessary to take a plurality of shots after the release button has been pressed down fully, such as when creating an image for an arbitrary aperture value (first embodiment), bracketed exposure, or wide dynamic range exposure, a shutter sound is not emitted a plurality of times, and the photographer is not made to feel uneasy.

With each of the embodiments of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an imaging section for photoelectrically converting a subject image formed by a photographing lens and outputting image data;
   an aperture control section, arranged on the optical path of the photographing lens, for narrowing subject light flux at a first aperture value and a second aperture value;
   a shooting control section for, in response to a release instruction, imaging a first image at the first aperture value and, after completion of imaging of the first image, reading out first image data from the imaging section while at the same time carrying out a stopping operation to the second aperture value using the aperture control section, imaging a second image at the second aperture value and, after completion of imaging of the second image, reading out second image data from the imaging section; and
   an image processing section for detecting an amount of variation in contrast value for each location in the first image data and the second image data, and carrying out processing to blur at an intensity of blurring according to the amount of variation for each location in the first image data and the second image data,
   wherein, the shooting control section acquires image data at the time of reset of each pixel of the imaging section before imaging of the first image, and creates the first image data by removing the image data for each pixel at the time of reset from the first image data for each pixel that has been acquired by the imaging section, after imaging of the first image, and
   the aperture control section carries out a stopping operation to the first aperture value simultaneously with the imaging control section reading out image data at the time of the reset from the imaging section.

2. The imaging device of claim 1, further wherein:
   the imaging section has a global shutter function.

3. The imaging device of claim 1, further wherein:
   the first aperture value is a wide-open aperture value.

4. The imaging device of claim 1, further wherein:
   the image processing section sets a specified evaluation pixel for first and second image data, and sets an evaluation area comprised of pixels surrounding the evaluation pixel, sums information relating to differences between data of the evaluation pixel and data of the surrounding pixels, within the evaluation area, and calculates contrast values for each of the locations.

5. The imaging device of claim 4, further wherein:
   the image processing section makes a difference in contrast values at each location in the first image data and the second image data the amount of variation.

6. The imaging device of claim 1, wherein:
   the image processing device executes the blurring processing for RAW image data that has been output from the imaging section, or for RGB image data resulting from processing of the RAW image data, or for YCC image data resulting from processing of the RGB image data.

7. The imaging device of claim 1, wherein:
   the image processing section executes the blurring process after carrying out image expansion processing, for JPEG image data that has been generated based on image data output from the imaging section.

8. The imaging device of claim 1, further comprising:
   a storage section for storing image data, and wherein the image processing section stores image data in the storage section, and stores amounts of variation in the contrast values between the first aperture value and the second aperture value, relating to blurring processing of the image data, in the storage section.

9. The imaging device of claim 8, wherein
   the image processing section stores amounts of variation in the contrast values for each of R, G and B in the storage section.

10. The imaging device of claim 8, wherein
    the image processing section stores image data after the blurring processing has been carried out in the storage section.

11. The imaging device of claim 10, wherein
    the image processing section stores amounts of variation in the contrast values for each of R, G and B in the storage section.

12. The imaging device of claim 8, wherein
    the image processing section stores RAW image data before carrying out the blurring processing in the storage section.

13. The imaging device of claim 12, wherein:
    the image processing section stores amounts of variation in the contrast values for each of R, G and B in the storage section.

14. The imaging device of claim 1, further comprising:
    a display section for carrying out live view display based on the image data output from the imaging section; and a second diaphragm section arranged close to a diaphragm controlled by the diaphragm control section, wherein the exposure control section changes between the first aperture value and the second aperture value using the second diaphragm section during live view display, and the image processing section carries out the blurring processing based on the image data acquired by the imaging section, while the display section carries out live view display based on image data that has been subjected to the blurring processing.

15. The imaging device of claim 1, wherein:
an image sensor of the imaging section is comprised of photoelectric conversion elements corresponding to each pixel, and a charge accumulation section, wherein the exposure control section controls exposure time when taking the first image and the second image by controlling accumulation time of the charge accumulation section.

16. The imaging device of claim 1, wherein the release instruction is a caused by a user pressing a release button to cause a second release switch to be turned on.

17. An imaging device, comprising:
an imaging section for photoelectrically converting a subject image formed by a photographing lens and outputting image data;
an aperture control section, arranged on the optical path of the photographing lens, for narrowing subject light flux at a first aperture value and a second aperture value;
a shooting control section for, in response to a release instruction, imaging a first image at the first aperture value and, after completion of imaging of the first image, reading out first image data from the imaging section while at the same time carrying out a stopping down operation to the second aperture value using the aperture control section, imaging a second image at the second aperture value and, after completion of imaging of the second image, reading out second image data from the imaging section;
an image processing section for detecting an amount of variation in contrast value for each location in the first image data and the second image data, and carrying out processing to blur at an intensity of blurring according to the amount of variation for each location in the first image data and the second image data; and
a virtual aperture value setting section for setting a virtual aperture in order to adjust the blurring intensity,
wherein the image processing section calculates the blurring intensity in accordance with the amount of variation, based on a virtual aperture set by the virtual aperture value setting section.

18. The imaging device of claim 17, wherein:
the image processing section estimates a bokeh amount with the virtual aperture value in accordance with the amount of variation, and calculates blurring intensity based on the estimated bokeh amount.

19. The imaging device of claim 18, wherein:
blurring processing according to the blurring intensity is carried out for every evaluation pixel for all pixels of the first image data and the second image data.

20. An imaging device, comprising:
an imaging section for photoelectrically converting a subject image formed by a photographing lens and outputting image data;
an aperture control section, arranged on the optical path of the photographing lens, for narrowing subject light flux at a first aperture value and a second aperture value;
a shooting control section for, in response to a release instruction, imaging a first image at the first aperture value and, after completion of imaging of the first image, reading out first image data from the imaging section while at the same time carrying out a stopping down operation to the second aperture value using the aperture control section, imaging a second image at the second aperture value and, after completion of imaging of the second image, reading out second image data from the imaging section;
an image processing section for detecting an amount of variation in contrast value for each location in the first image data and the second image data, and carrying out processing to blur at an intensity of blurring according to the amount of variation for each location in the first image data and the second image data; and
a storage section for storing image data,
wherein the image processing section stores image data after the blurring processing has been carried out, and the first image data and the second image data, in the storage section, and stores file names of image files of the first image data and the second image data as identical objects with the same file name as the image file name of the image data after the blurring processing has been carried out.

21. A control method for an imaging device comprising the steps of:
carrying out imaging of a first image at a first aperture value, and reading out first image data after imaging of the first image has been completed, while simultaneously carrying out a stopping operation to drive a diaphragm from the first aperture value to a second aperture value;
carrying out imaging of a second image at the second aperture value, and reading out second image data after imaging of the second image has been completed; and
detecting an amount of variation in contrast values for each location in the first image data and the second image data, and carrying out processing to blur at an intensity of blurring according to the amount of variation between each location in the first image and the second image,
wherein, image data at the time of reset of each pixel is acquired before imaging of the first image, and the first image data for each pixel of the first image data that has been acquired by imaging of the first image is created by removing the image data for each pixel at the time of reset, and
a stopping operation to the first aperture value is carried out simultaneously with reading out of image data at the time of the reset from the imaging section.

22. An imaging device, comprising:
an imaging section for photoelectrically converting a subject image formed by a photographing lens and outputting image data;
an aperture control section, arranged on the optical path of the photographing lens, for narrowing subject light flux at a first aperture value and a second aperture value;
a shooting control section for, in response to a release instruction, imaging a first image at the first aperture value and, after completion of imaging of the first image, reading out first image data from the imaging section while at the same time carrying out a stopping operation to the second aperture value using the aperture control section, imaging a second image at the second aperture value and, after completion of imaging of the second image, reading out second image data from the imaging section; and
an image processing section for carrying out image processing for the first image data and the second image data that have been read out by the shooting control section,
wherein, the shooting control section acquires image data at the time of reset of each pixel of the imaging section before imaging of the first image, and creates the first image data by removing the image data for each pixel at the time of reset from the first image data for each pixel that has been acquired by the imaging section, after imaging of the first image, and the aperture control section carries out a stopping operation to the first aperture value simultaneously with the imaging control section reading out image data at the time of the reset from the imaging section.

23. The imaging device of claim 22, wherein:

the image processing section detects an amount of variation in contrast values for each location in the first image data and the second image data, and carries out blurring processing an intensity of blurring according to the amount of variation between each location in the first image data and the second image data.

24. The imaging device of claim 22, wherein the release instruction is a caused by a user pressing a release button to cause a second release switch to be turned on.

* * * * *